(12) United States Patent
Schaevitz et al.

(10) Patent No.: US 7,897,292 B2
(45) Date of Patent: Mar. 1, 2011

(54) FUEL CELL APPARATUS AND METHODS

(75) Inventors: Samuel B. Schaevitz, Fremont, CA (US); Aleksander Franz, Winchester, MA (US); Roger Barton, Andover, MA (US); Alan Ludwiszewski, Andover, MA (US)

(73) Assignee: Lilliputian Systems, Inc., Wilmington, MA (US)

( * ) Notice: Subject to any disclaimer, the term of this patent is extended or adjusted under 35 U.S.C. 154(b) by 1360 days.

(21) Appl. No.: 11/402,162

(22) Filed: Apr. 10, 2006

(65) Prior Publication Data

US 2006/0263665 A1    Nov. 23, 2006

Related U.S. Application Data

(60) Provisional application No. 60/682,187, filed on May 18, 2005.

(51) Int. Cl.
*H01M 2/02* (2006.01)
(52) U.S. Cl. .................. 429/508; 429/417; 429/419; 429/433
(58) Field of Classification Search .................. 429/34, 429/508, 417, 419, 433
See application file for complete search history.

(56) References Cited

U.S. PATENT DOCUMENTS

| | | | |
|---|---|---|---|
| 5,089,455 A | 2/1992 | Ketcham et al. | |
| 5,190,834 A | 3/1993 | Kendall | |
| 5,273,837 A | 12/1993 | Aitken et al. | |
| 5,554,454 A | 9/1996 | Gardner et al. | |
| 5,595,833 A | 1/1997 | Gardner et al. | |
| 5,750,279 A | 5/1998 | Carolan et al. | |
| 5,925,477 A | 7/1999 | Ledjeff et al. | |
| 6,183,897 B1 | 2/2001 | Hartvigsen et al. | |
| 6,479,178 B2 | 11/2002 | Barnett | |
| 6,485,852 B1 | 11/2002 | Miller et al. | |
| 6,623,881 B2 | 9/2003 | Badding et al. | |
| 6,638,654 B2 | 10/2003 | Jankowksi et al. | |
| 6,649,295 B2 | 11/2003 | Hamrock et al. | |
| 6,677,070 B2 | 1/2004 | Kearl | |
| 6,680,139 B2 | 1/2004 | Narayanan et al. | |
| 6,682,841 B1 | 1/2004 | Armstrong et al. | |
| 6,852,436 B2 | 2/2005 | Badding et al. | |
| 2002/0150532 A1 | 10/2002 | Grieve et al. | |

(Continued)

FOREIGN PATENT DOCUMENTS

EP    0798800 A2    10/1997

(Continued)

OTHER PUBLICATIONS

International Searching Authority, International Search Report—Application No. PCT/US2006/019781, dated Apr. 18, 2007 (5 pages).

(Continued)

*Primary Examiner*—Jane Rhee
(74) *Attorney, Agent, or Firm*—Sunstein Kann Murphy & Timbers LLP

(57) ABSTRACT

Fuel cells having an efficient means of thermal insulation such that all of the components requiring high temperature operation are contained within a single housing and whereby such thermal insulation is disposed exterior to such housing.

22 Claims, 10 Drawing Sheets

U.S. PATENT DOCUMENTS

| | | |
|---|---|---|
| 2003/0077498 A1 | 4/2003 | Cable et al. |
| 2003/0096147 A1 | 5/2003 | Badding et al. |
| 2003/0118879 A1 | 6/2003 | Barnett et al. |
| 2004/0023087 A1 | 2/2004 | Redmond |
| 2004/0028975 A1 | 2/2004 | Badding et al. |
| 2004/0053100 A1 | 3/2004 | Stanley et al. |
| 2004/0115503 A1 | 6/2004 | Jacobson et al. |
| 2004/0157096 A1 | 8/2004 | Peterson |
| 2005/0008909 A1 | 1/2005 | Kaye et al. |
| 2005/0074643 A1 | 4/2005 | Adams et al. |
| 2005/0221131 A1 | 10/2005 | Roy et al. |
| 2005/0227134 A1 | 10/2005 | Nguyen |
| 2005/0249993 A1 | 11/2005 | Horiuchi et al. |

FOREIGN PATENT DOCUMENTS

| | | |
|---|---|---|
| EP | 1416551 A2 | 5/2004 |
| JP | 4190569 A | 7/1992 |
| WO | 2005030376 A1 | 4/2005 |

OTHER PUBLICATIONS

International Searching Authority, Written Opinion of the International Searching Authority—Application No. PCT/US2006/019781, dated Apr. 18, 2007 (11 pages).

FUEL CELL APPARATUS AND METHODS

CROSS REFERENCE TO RELATED APPLICATIONS

This Application claims priority to provisional application Ser. No. 60/682,187, filed May 18, 2005, entitled Fuel Cell Apparatus and Methods, the contents of which are incorporated herein.

TECHNICAL FIELD

The invention relates to apparatus and methods that improve fuel cell efficiency and safety. In one embodiment, the invention relates to fuel cells adapted for improving energy balance by integrating multiple fuel cell components in an isothermal zone.

BACKGROUND

Fuel cells that operate in conjunction with replaceable fuel canisters filled with, for example, gaseous hydrogen, methanol, butane or diesel fuel, are a developing technology. These types of fuel cells are designed to compete with the various battery solutions that power consumer products. The competitiveness of these fuel cells with regard to batteries depends on a number of factors, such as the energy density of the fuel in the canister; the ability of the fuel cell to convert chemical energy to electrical energy with certain efficiencies; and the need to keep the fuel cell stack, along with associated fluid pumping and power control components, no larger than that of a competitive battery.

Improvements in energy density and chemical conversion efficiency have been achieved with solid-oxide-fuel cells (SOFCs), which utilize ceramic membranes instead of polymer membranes. Because solid-oxide fuel cells can convert a variety of different molecular fuel types into electricity, e.g., various hydrocarbons, a solid-oxide fuel cell can utilize energy dense liquid fuels and still achieve suitable energy conversion efficiencies.

However, solid-oxide fuel cells, require membrane and catalytic operation at temperatures in excess of 600° C., often in excess of 750° C. Consequently, designers of solid-oxide fuel cells for portable power applications must protect the end user from the extreme heat without adding excessively to the size of the overall system. Additionally, a present day solid-oxide fuel cell operating at 800° C. can easily radiate or transmit ten times more energy to the environment as waste heat than the electrical energy delivered to the user. Such a system cannot be more than 10% efficient, i.e., the system uses more than 90% of the fuel energy for the sole purpose of maintaining the reactor's 800° C. operating temperature. Therefore, with such low efficiency, it is unlikely for current solid-oxide fuel cells to compete with batteries.

State-of-the-art portable solid-oxide fuel cells have not been able to achieve similar volumes to batteries. Solid-oxide fuel cell generator, without insulation, rarely exceeds 0.35 watts per cubic centimeter (W/cc). Upon adding insulating layers with thickness sufficient for energy efficient operation, most conventional solid-oxide fuel cells provide power to volume ratios below 0.1 W/cc.

Additionally, existing fuel cell apparatus and systems designs provide heated components (other than the solid-oxide fuel cell stack) to improve the efficiency of the system. However, each heated component adds to the volume of the apparatus and to the amount of insulation required to avoid excessive heat dissipation.

As a result, there exists a need to build a miniature fuel cell apparatus, which when combined with a portable fuel canister, can provide energy storage capacities similar to or exceeding that of rechargeable batteries, e.g., greater than 200 Watt-hours per liter (W-hr/L), and preferably greater than 400 W-hr/L. A fuel cell would be of great value for powering portable electronics, whose functions today are often limited by the energy capacity of batteries. In addition, given the many potential power supply applications of interest to individual consumers, a fuel cell that is safe for individual users is also of great value.

SUMMARY OF THE INVENTION

Fuel efficiency is achieved, in part, by regulating thermal efficiency. Specifically, improved thermal efficiency results, in part, from any one or a combination of the following factors: integration of the fuel reformer, fuel cell, and tail gas burner into a single, essentially isothermal, zone of high temperature; substantially reducing the heat dissipation area of the hot zone by increasing the power density in the fuel cell stack, preferably to values in excess of 2 W/cc; use of an efficient (either aerogel or vacuum) means of thermal insulation such that all of the components requiring high temperature operation are contained within a single housing and whereby such thermal insulation is disposed exterior to such housing; incorporation of low-thermal conductance connections for exchanging fluids between the fuel cell apparatus and the outside world and for the extraction of electrical currents from the fuel cell; and/or incorporation of a heat recuperator, preferably located within the thermal insulation zone, such that the heat recuperator can operate at a temperature intermediate between the temperature of the hot zone and the outside ambient.

As used herein, "fuel cell apparatus" and "fuel cell systems" refer to an apparatus or device that can contain some or all of the following components: a fuel reformer, a tail gas burner, anode/electrolyte/cathode elements, pumps, and controls. However, "fuel cell" refers to the anode/electrolyte/cathode membrane structure. In addition, "power density" refers to a ratio of the power generated in a given volume and as otherwise understood in the fuel cell art.

Although, the invention relates to different aspects and embodiments, it is understood that the different aspects and embodiments disclosed herein can be integrated together as a whole or in part, as appropriate. Thus, each embodiment disclosed herein can be incorporated in each of the aspects to varying degrees as appropriate for a given implementation. Furthermore, although some aspects and embodiments are described using "means for" terminology, it is understood that all aspects, embodiments, and other concepts disclosed herein can serve as support for means plus function claims, even if specific "means for" language is not used in a specific portion of the written description.

It should be understood that the terms "a," "an," and "the" mean "one or more," unless expressly specified otherwise.

As used herein "communication with" refers to direct or indirect communication, e.g., direct or indirect contact such as through appropriate connections such as walls, tubes, semiconductor traces and layers, wire, and other means as known in the art, and combinations thereof.

In one aspect, the invention relates to a fuel cell apparatus that includes a housing and one or more safety features.

The foregoing, and other features and advantages of the invention, as well as the invention itself, will be more fully understood from the description, drawings, and claims which follow.

BRIEF DESCRIPTION OF THE DRAWINGS

Reference to the figures herein is intended to provide a better understanding of the methods and apparatus of the invention but are not intended to limit the scope of the invention to the specifically depicted embodiments. The drawings are not necessarily to scale, emphasis instead being placed upon illustrating the principles of the invention. Like reference characters in the respective figures typically indicate corresponding parts.

DETAILED DESCRIPTION

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

It should be understood that the order of the steps of the methods of the invention is immaterial so long as the invention remains operable. Moreover, two or more steps may be conducted simultaneously unless otherwise specified.

Integrated Fuel Cell Apparatus, Package, and Connections

The fuel cell apparatus embodiments described herein can produce electrical power in excess of 2 W/cc and in excess of 3 W/cc. Such fuel cell apparatus are uniquely capable of producing insulated package sizes small enough for portable application, even though the power ratings are below 100 watts, below 20 watts, or below 5 watts. In contrast, existing fuel cell designs only generate power densities typically below 0.5 W/cc. As a result, the low power density fuel cells are too large and not efficient enough for many applications such as, for example, consumer battery substitutes.

The power density (W/cc) depends primarily upon the design of the integrated fuel cell apparatus and the individual fuel cell or fuel cell stack (plurality of individual fuel cells). In particular, the level of proximal integration of the various fuel cell apparatus components within the housing is an important design factor. As a result, fuel cell apparatus efficiency can be a function of how close the various fuel cell membranes can be placed subject to the constraints of mechanical strength and fluid routing. Many of the aspects and embodiments described herein relate to component integration within one thermal region and related techniques to control thermal losses. The use of semiconductor structures in many of the embodiments disclosed herein enables the small sizes and high energy densities that allow for fuel cell apparatus that can compete with various battery types.

Figure 1:
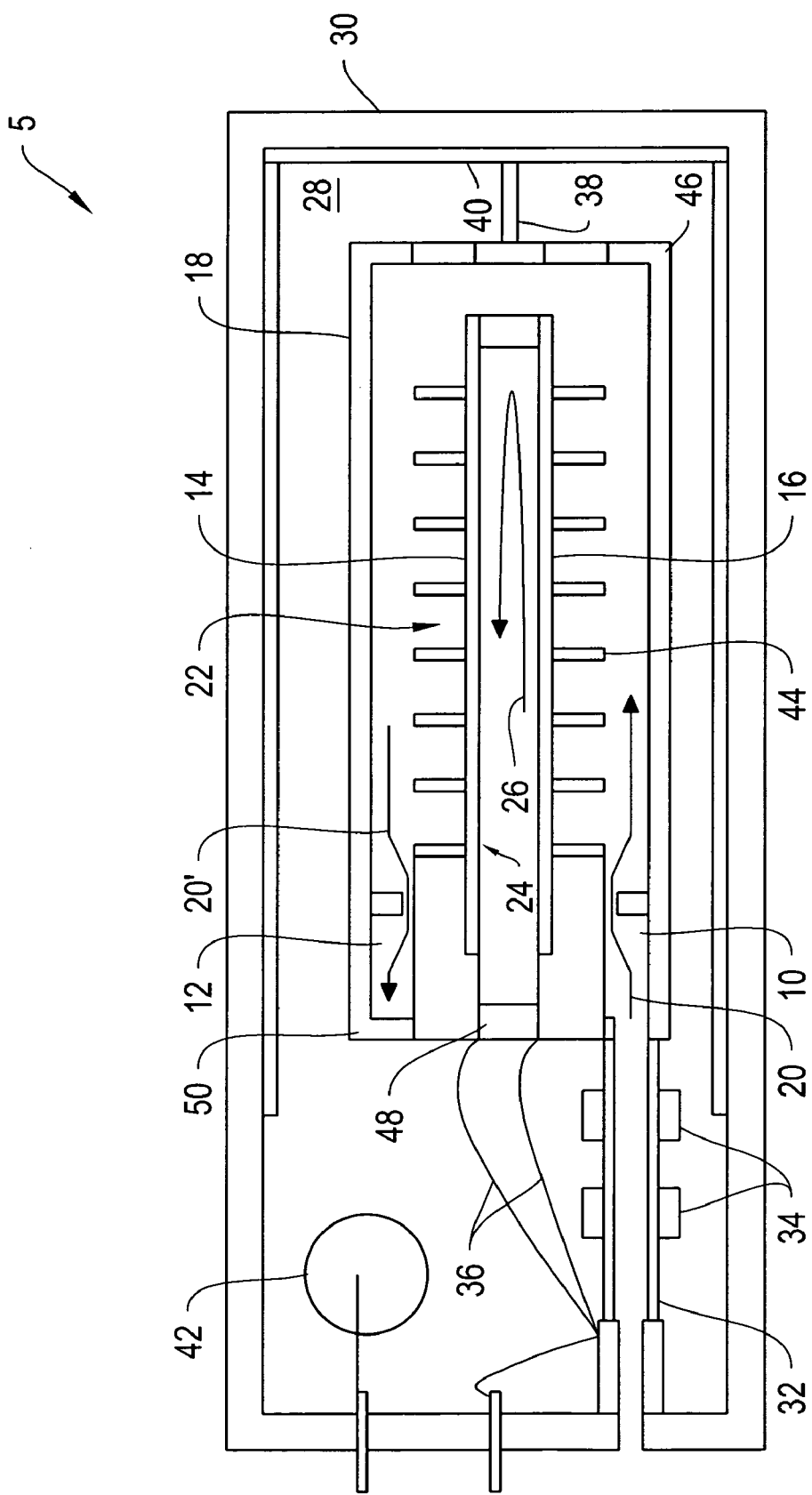
FIG. 1 is a cross-sectional side view of a fuel cell apparatus according to an illustrative embodiment of the invention.

FIG. 1 shows one example of a fuel cell apparatus 5, in cross-sectional view. FIG. 1 illustrates a fuel reformer 10, a pair of solid oxide fuel cell membranes 14 and 16, and a tail gas burner 12 all contained within a single housing 18. The housing is made of a thermally conductive material such that all of the components within the housing can operate at substantially the same temperature. Thus, the housing facilitates the formation of a zone that is substantially isothermal.

The housing 18 in FIG. 1 includes within it all of the flow routing means for distributing fuel and air to the fuel cell(s). The fuel stream 20 passes out of the fuel reformer 10, along the anode side of the first fuel cell 16. The fuel stream 20' then passes along the anode side 22 of the second fuel cell 14 and finally into the tail gas burner 12. The air stream 26 passes (by means of internal routing channels not shown) along the cathode side 24 of the fuel cells 14, 16 and culminates into the tail gas burner 12 where the excess air is available for the combustion of unused exhausted fuel. (The air entrance to the tail gas burner does not appear in FIG. 1.)

Also shown in FIG. 1 is an insulating volume 28, which separates the housing 18 from an outer wall 30 of the apparatus 5. The outer wall is substantially maintained at a temperature that is at or near the ambient temperature of the electrical device powered by the fuel cell apparatus. For efficient operation of a solid oxide fuel cell apparatus, the temperature within the housing should be greater than 400° C., with better operating efficiencies obtained if the temperature is maintained in excess of 550° C., 600° C., or 750° C. The ambient temperatures of external electrical circuits and the outer wall 30 of a fuel cell apparatus will typically be in the range of 0° C. to about 60° C. Therefore, in this embodiment, a large thermal gradient in excess of 300° C. is desirably maintained not only through the thickness of the intervening insulating volume 28, but also along fluidic connections 32, electrical connections 36, and along mechanical supports 38.

The insulating volume can incorporate insulation to substantially reduce heat dissipation from the housing. Thus, a partial vacuum can be formed, within the insulating volume or a low thermal conductance material can be added to the insulating volume. An infrared radiation shield 40 can also be disposed within or upon the fuel cell apparatus. It is beneficial to maintain the required low level of total gas pressure in the insulating volume when fabricating a low pressure or vacuum insulation embodiment. For this purpose, it is useful to add a getter material 42 which has the capability of absorbing background gases and maintaining high levels of vacuum over the operating life of the device. A non-evaporable getter, which can be activated through electrical heating, is useful for this purpose, such as the SAES getters ST 171 device (www.saesgetters.com).

The integrated fuel cell contained within a housing can have a total thickness of 2.5 mm. In FIG. 1, two fuel cell layers 14 and 16, and three routing layers 46, 48, and 50 are present, each with 0.5 mm thickness. Each of the two fuel cell layers is capable of producing 0.4 W/cm$^2$ of electrical power. As a result, an exemplary integrated fuel cell apparatus is capable of delivering (2*0.4)/2.5=3.2 W/cc of power density.

The housing, which integrates the functions of a fuel reformer, a set of fuel cell membranes, a tail gas burner, and all internal fluid manifolds in one thermal zone, can be fabricated through any number of fabrication techniques. In particular, embodiments of the invention can be fabricated using MEMS techniques (micro-electro-mechanical systems) or micromachining techniques. Such techniques make it possible to integrate thin film materials (for instance thin film electrolytes, anodes, cathodes and/or electrical connections) along with etched microchannels for control of fluid flow onto a common substrate that is thermally conductive and mechanically robust. Structural support members are included in some embodiments as they are useful for patterning either anodes or cathodes into discrete regions. Individual membranes electrode assemblies and fluid manifolds can be stacked together by a variety of bonding techniques, to create fluid processing "systems."

For example, an integrated housing can be assembled from a group of substantially planar or non-planar semiconductor structures. Specifically, five silicon substrates can be bonded together to form the "box" that various fuel cell apparatus components are integrated within. Bonding together the five silicon substrates, results in a stacked configuration. In one embodiment, the substrates can be stacked as follows: (1) fuel reformer substrate including fluidic interconnects; (2) a membrane electrode assembly, (3) a fluid routing layer, (4) another membrane electrode assembly, and (5) a top fluid routing layer including tail gas burner. Thus, a stack of layers can form some or all of the integrated fuel cell apparatus.

In a preferred embodiment, silicon is chosen as the substrate for building the fuel cell membranes and other manifold structures. However, micromachining techniques also exist for building fluid flow channels in rigid wafers of glass and ceramic, all materials which possess the high temperature strength required for solid oxide fuel cells. In order to prevent electrical shorting between different points of the membrane assembly, a silicon substrate can be coated with layers of silicon oxide or silicon nitride to render it electrically insulating.

Etched fluidic microchannels are formed in the above substrates by a variety of techniques, including wet and dry chemical etching, laser ablation, diamond milling, tape casting, or injection molding. A variety of substrate or wafer bonding techniques are available including fusion bonding, anodic bonding, sealing by means of eutectic solder materials or thin films, or sealing by means of glass frits.

Fuel cell assemblies, including the anode, cathode, and electrolyte can be deposited by a variety of thin and thick film deposition techniques including sputtering, evaporation, chemical vapor deposition, laser ablation, screen-printing, dip coating, or vapor spray techniques.

The preferred material for the electrolyte is yttria-stabilized zirconia (YSZ), although a variety of doped ceria materials are also available for this purpose. The preferred material for the anode of the fuel cell is a cermet of nickel and YSZ, although other catalytic metals may be employed such as Pt, Pd, Fe or Co, and other oxide matrix materials can be used such as ceria. The preferred material for the cathode of the fuel cell is lanthanum (strontium) manganate (LSM), although other cathode materials have been described including lanthanaum (strontium) cobaltite (LSC) and lanthanum (strontium) cobalt-ferrite (LSCF). The preferred material for thin film electrical connections in the fuel cell is platinum, although lanthanum chromite has also been described for this application.

Figure 2:
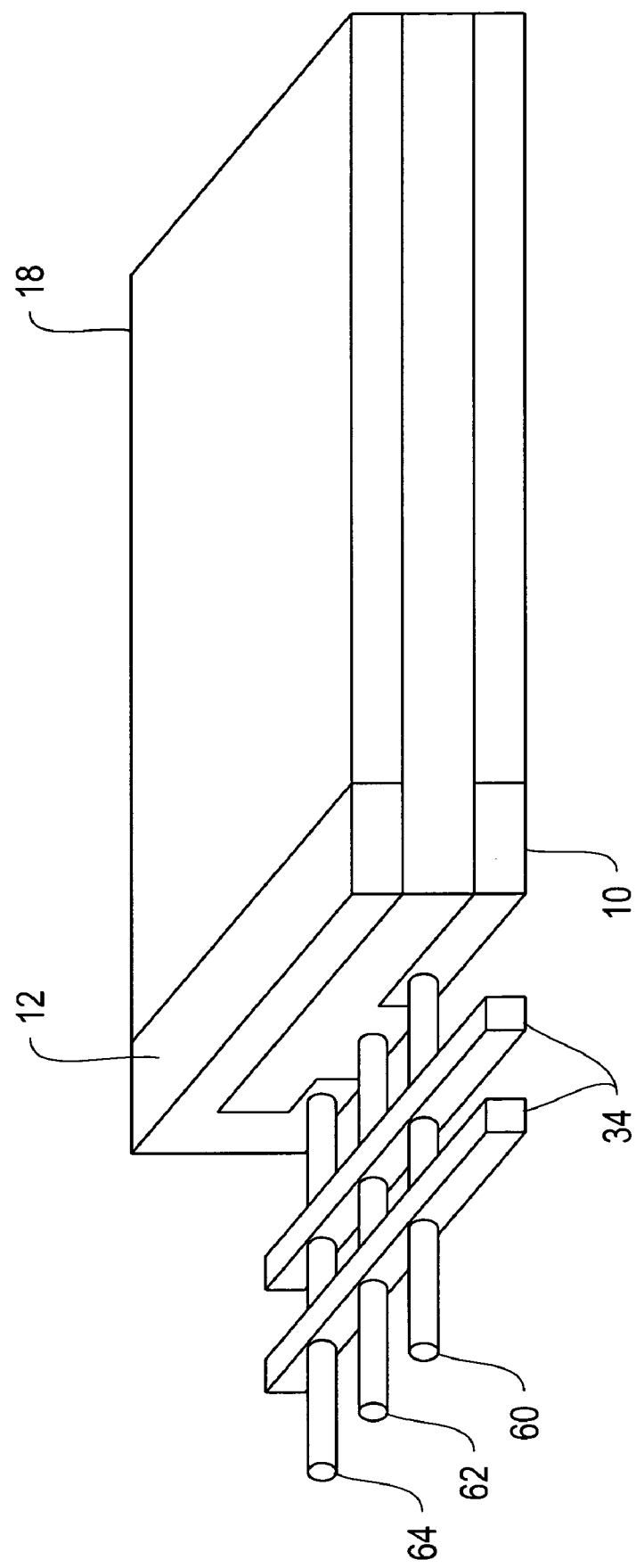
FIG. 2 is a perspective view of a fuel cell apparatus component having fluidic connections and a heat recuperator according to an illustrative embodiment of the invention.

FIG. 2 is a further illustration of the fuel cell apparatus of FIG. 1, emphasizing the arrangement of fluidic connections and a heat recuperator 34. The integrated fuel cell apparatus' housing 18 is shown only in its external aspect, with subregions denoting the suggested placement of a fuel reformer 10, and a tail gas burner (or catalytic converter) 12. A mixture of fuel and air enters along an inlet tube 60 directly to the fuel reformer 10. After which, by means of internal routing channels, the reformed fuel passes by the anode of the fuel cell, eventually ending up in the region of the tail gas burner 12. Air for the cathode of the fuel cell enters through an inlet tube 62 and flows internally via a controlled route to the cathode of the fuel cell. Both air and fuel streams are finally re-united in the tail gas burner 12 for extraction of any residual heat of oxidation before exiting the hot zone through an exit tube 64.

The inlet and outlet tubes bridge the region between the housing and the cold outer wall and should be designed for low thermal conductivity. As an example, these tubes can be composed of silicon nitride, preferably with wall thickness of 5 microns or less, such as are described International Publication No. WO 03/013729. Alternatively, the tubes can be made from silica glass capillaries. For example, glass capillaries are available with 1 mm outer diameters and wall thicknesses of only 125 microns. The thermal power that will be conducted along such capillaries if they are 5 mm long and span a temperature gradient of 800° C. is only 0.05 watts.

It will be recognized by those skilled in the art that other arrangements of the fuel reformer and tail gas burner within the housing are within the scope of this invention. Similarly, other arrangements and different numbers of inlet and exit tubes are possible than those illustrated in FIG. 2. For instance, for larger fuel cell apparatus it may be preferable to add a fourth tube for delivering independent flows of fuel and air from an external flow regulation system directly into the fuel reformer. It may also be preferable to provide two independent sources of air into the cathode region, such that fluid pressure drops are more effectively managed within the fuel cell apparatus and/or as a means for controlling fuel cell voltages in local regions of the fuel cell membranes. Also, concentric tubes can also be used in certain embodiment.

Heat Recuperator

Again referring to FIG. 2, the heat recuperator 34, shown as two bars, is a means for heat recuperation and can be built as an integral part of the fluid tube assembly. The heat recuperator is typically made of a thermally conductive material, such as silicon, such that the heat of the exhaust gases passing through the exit tube 64 can be absorbed and transferred to the incoming gas streams in the inlet tubes 60 and 62.

As shown in FIG. 1, improved performance is possible by placing the heat recuperator 34 within the insulating volume 28. In this position, the various internal temperatures of the heat recuperator can be maintained intermediate between the temperature of the integrated fuel cell apparatus and the outer wall. Placing the heat recuperator within the existing insulating volume also reduces the overall system size by eliminating separate insulation around the heat recuperator. Further, aligning the thermal gradient of the heat recuperator with the exiting thermal gradient between the integrated fuel cell apparatus and the outer wall decreases the heat loss from the heat recuperator because there is little if any temperature difference between a given section of the heat recuperator and the adjacent insulating volume.

Various means of heat recuperation are possible, other than the parallel tube arrangement shown in FIG. 2. For instance, a tube-in-tube counterflow arrangement is appropriate or a stack of thin metal sheets formed to allow for a counterflow by means of machined or shaped microchannels. Many other arrangements fall within the scope of this invention, as long as the physical placement of the heat recuperator is within the intermediate region between the isothermal ("hot") zone of the fuel cell apparatus and the cold outer wall.

Low Thermal Conductance Fluid Connection

A general goal of the invention is to manage the total heat dissipation away from the housing. In one particular element, to manage the heat loss through the tubes, ($Q_{tubes}$), which accounts for the solid conduction of heat along the length of fluidic inlet and exit tubes, the heat loss through the tubes can be calculated from the product of a) the thermal conductivity of the tube wall material, b) the temperature drop along the tube, and c) the cross sectional area of the tube wall material, divided by d) the length of the tube.

For small fuel cell apparatus systems, a maximum heat loss allowed through the fluidic tubes is determined to improve system efficiency. That heat loss, $Q_{tubes}$, is desirably maintained below 0.1 watts per tube, preferably less than 0.05 watts per tube. This heat loss value is significantly below the embodiments known in the art, however, system efficiency improves dramatically when the fluidic connection tubes are constructed with heat loss below this critical value. Table 2 shows examples of typical known tube materials and design and exemplary tubes (embodiments 3 and 4) suitable for use with the present embodiments that are constructed to satisfy the critical heat loss condition.

TABLE 2

Comparison of fluid connection tube materials. (The power loss Q assumes a total temperature drop of 700° C.)

|  | Tube material | Thermal conductivity W/cm-k | wall thickness (microns) | tube length/ diameter (mm/mm) | power loss per tube: Q (watts) |
|---|---|---|---|---|---|
| embodiment 1 | ⅛" stainless steel tube | 0.25 | 325 | 30/3 | 1.9 |
| embodiment 2 | stainless steel capillary | 0.25 | 125 | 20/1 | 0.35 |
| embodiment 3 | thin wall silicon nitride | 0.4 | 2 | 3/0.5 | 0.03 |
| embodiment 4 | glass capillary | 0.01 | 125 | 5/1 | 0.05 |

In a 33% efficient, 2 watt fuel cell apparatus generator, the fuel cell apparatus would be expected to burn an equivalent of 6 watts of fuel and a thermal loss of 0.1 watts per tube would represent only 5% of the total power consumed. For larger fuel cell apparatus in the range of 5 to 30 watts either more tubes or tubes with larger cross section may be necessary to handle increased amounts of fluid flow. By maintaining the thermal loss of each tube below 0.5 watts, and preferably below 0.1 watts, the percentage of thermal loss due to fluid connections can be maintained at or below 10%, and preferably below 5%, of the total power burned as fuel in the device.

Low Thermal Conductance Electrical Connection

Another general goal of the invention is to reduce the heat loss represented by solid conduction along electrical connections. In a preferred embodiment, the value of heat loss per electrical wire should be less than 0.5 watts, and more preferably less than about 0.1 watts. An electrical loss of 0.1 watts or less per wire, however, requires the use of higher resistance and finer diameter wire connections. Table 3 shows the correlation between wire diameter, wire resistance, and heat loss for known wires and those useful in the invention (embodiments 3 and 4). Note the inverse correlation between wire resistance and thermal power loss along the wire, which is typical for metal conductors. For known fuel cell systems, where stack powers are typically in excess of 100 watts and the total heat dissipated is greater than 300 watts, a loss of 1 watt per wire is not excessive. For fuel cell apparatus rated at 20 watts or less, it is desirable to reduce the heat loss due to the wires. The method employed in this invention for controlling heat loss is to choose electrical connections where the electrical resistance is in excess of 0.1 ohms and preferably greater than 0.5 ohms.

TABLE 3

Comparison of electrical connection wires. (The temperature drop along the length of wire is assumed to be 700° C.)

|  | wire material | wire diameter (microns) | wire length (mm) | wire resistance (ohms) | power loss per wire (watts) |
|---|---|---|---|---|---|
| embodiment 1 | Cr/Ni alloy | 800 | 30 | 0.1 | 0.34 |
| embodiment 2 | Pt | 800 | 30 | 0.02 | 1 |

TABLE 3-continued

Comparison of electrical connection wires. (The temperature drop along the length of wire is assumed to be 700° C.)

|  | wire material | wire diameter (microns) | wire length (mm) | wire resistance (ohms) | power loss per wire (watts) |
|---|---|---|---|---|---|
| embodiment 3 | Cr/Ni alloy | 100 | 5 | 1.27 | 0.03 |
| embodiment 4 | Pt | 50 | 5 | 0.81 | 0.02 |

From Table 3 choosing connecting wires for bridging the insulation space where the resistance of the wires exceeds 0.5 ohms is advantageous. To achieve an efficient fuel cell apparatus with this constraint, however, requires other changes to the fuel cell apparatus operating parameters and to the construction of the fuel cell stack. For instance, output currents must be maintained at a levels low enough to prevent excessive electrical power loss by means of resistance in the connecting wires. Thus, using the techniques disclosed herein, currents can be reduced at any given power level by increasing the fuel cell voltage. However, in the past, this objective was achieved by connecting or stacking individual fuel cells in series such that voltages are added. For this invention, which deploys connector wires in excess of 0.5 ohms, a stacked output voltage in excess of 10 volts is required, preferably in excess of 15 volts.

One method for voltage stacking is an in-plane stacking, arrangement, in which fuel cell membranes layers are stacked vertically such that the anode of one cell makes electrical contact with the cathode of the cell directly above it. A 10 volt output requirement for the fuel cell stack would require that twelve to twenty fuel cell membrane layers be assembled in the vertical stack The embodiment illustrated in FIG. 1, however, depicts only two membrane layers due to volume efficiency. Nevertheless, an advantageous output voltage is possible using the in-plane stacking concept disclosed herein.

Figure 3:
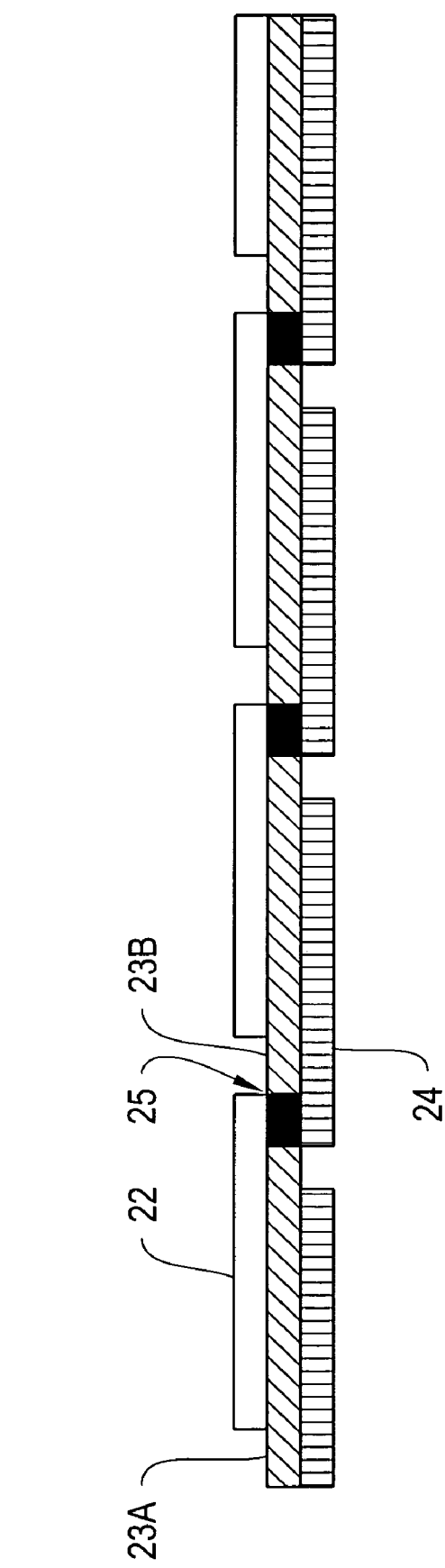
FIG. 3 is a schematic drawing of anodes, cathodes, and electrolytes arranged in a configuration suitable for use in the fuel cell apparatus according to an illustrative embodiment of the invention.

FIG. 3 illustrates the concept of in-plane stacking. In-plane stacking requires the ability to pattern anodes, cathodes, and electrolytes such that series type voltage connections can be made. In FIG. 3, in anode 22 of fuel cell electrolyte 23A is allowed electrically to contact a cathode 24 that is disposed behind an adjacent fuel cell electrolyte 23B. An interconnect material 25 allows for a low resistance electrical connection between anode 22 and cathode 24. Structural support members shown in FIG. 1 are also useful for patterning either anodes or 20 cathodes into discrete regions.

Given the compact nature of the integrated fuel cell apparatus shown in FIG. 1, and the goal that electrical connections be achieved with narrow gauge wires (diameters less than about 100 microns), it is also desirable to provide a reliable method for attaching the connector wires without the use of bulky screws or crimp connectors. In one embodiment, the narrow gauge wires should be attached to both the integrated fuel cell apparatus and the connector strip at the outer wall by means of a high temperature brazing alloy or preferably by bonding methods such as a thermo-mechanical bond.

Isothermal Nature of Integrated Fuel Cell Apparatus

The efficiency of a solid-oxide fuel cell apparatus improves when all the functions of fuel reformer, fuel cell and tail gas burner integrate into a single housing with minimum surface area. Efficiency also improves when the housing is designed with sufficient thermal conductivity to enable an efficient distribution of heat or sharing of thermal energy between components. In particular, the tail gas burner can be used to share supplemental heat that improves overall efficiency. Thus, the thermal energy generated in the tail gas burner maintains a higher and more efficient operating temperature in the fuel cell apparatus. In this fashion, the thermal stresses and costs associated with heat up or cool down of the device are reduced.

Furthermore, improved fuel cell efficiency is possible by operating the fuel cell at higher voltages, closer to an equilibrium electrochemical potential. Such an operating condition implies the generation of less waste heat when compared to operating at a lower fuel cell voltage. The required amount of thermal energy for maintaining operating temperature is attainable by extracting heat from the combustion of underutilized fuels in the tail gas burner.

Several methods can be employed to maintain sufficient thermal conductivity and nearly isothermal operation between components within the integrated fuel cell apparatus. Silicon, used as a substrate material is an excellent thermal conductor at elevated temperatures. Glass or ceramic substrates are suitable material choices based on thermal conductivity, as long as their resultant wall thicknesses are substantially in excess of 100 microns and preferably in excess of 300 microns. The thermal conductivity of glass substrates is enhanced by the deposition of metallic thin films over areas that are not electrically active, such as the outer surfaces of the housing. Candidate thermally conductive metal coatings include chromium, gold, and platinum.

As a means of enabling the substantially isothermal operation of the system, it is helpful to design the integrated housing such that separate components (fuel reformer, tail gas burner and the fuel cell membranes) share between any pair of them at least one common structural wall. This wall could be an outer wall of the housing or it could be an internal wall formed, for instance through the bonding of individual substrates.

By sharing structural walls and by providing substrates with sufficient thermal conductivity, it is possible to maintain any temperature differences between components during operation to less than 150° C., preferably less than 50° C.

Power Density

When designing a portable solid-oxide fuel cell apparatus, it is important to determine a minimum thickness of insulation material that is adequate for maintaining high operating temperatures without excessive consumption of fuel energy. The amount of heat that will dissipate from an integrated fuel cell apparatus is proportional to its surface area. An integrated fuel cell apparatus designed for a 5 watt application, therefore, becomes difficult to insulate efficiently since its surface-to-volume ratio is much higher than an integrated fuel cell apparatus designed for applications at 20 watts or more.

The power density of the integrated fuel cell apparatus is a significant design parameter. In particular, the power density may be the design parameter that most influences the final efficiency and size of the insulated package. The power density of the integrated fuel cell apparatus, expressed in watts per cubic centimeter (W/cc), determines how much surface area is exposed for every watt of electricity produced. As a result, the influence of integrated fuel cell apparatus electrical power density on final package size is large and disproportionate. For example, an integrated fuel cell apparatus which is capable of producing power at 5 watts and 1 w/cc will require a package size, including insulation, of 66 cc. In contrast, an integrated fuel cell apparatus rated at 5 watts and 2 w/cc can be insulated inside of a package of only 17.8 cc. Therefore, a two-fold increase in power density results in a 3.7 times decrease in package size with no loss in thermal efficiency. (This example assumes the use of an Aerogel™ insulation rated at 0.04 W/m-K, maintaining a temperature drop of 800° C.)

Figure 4:
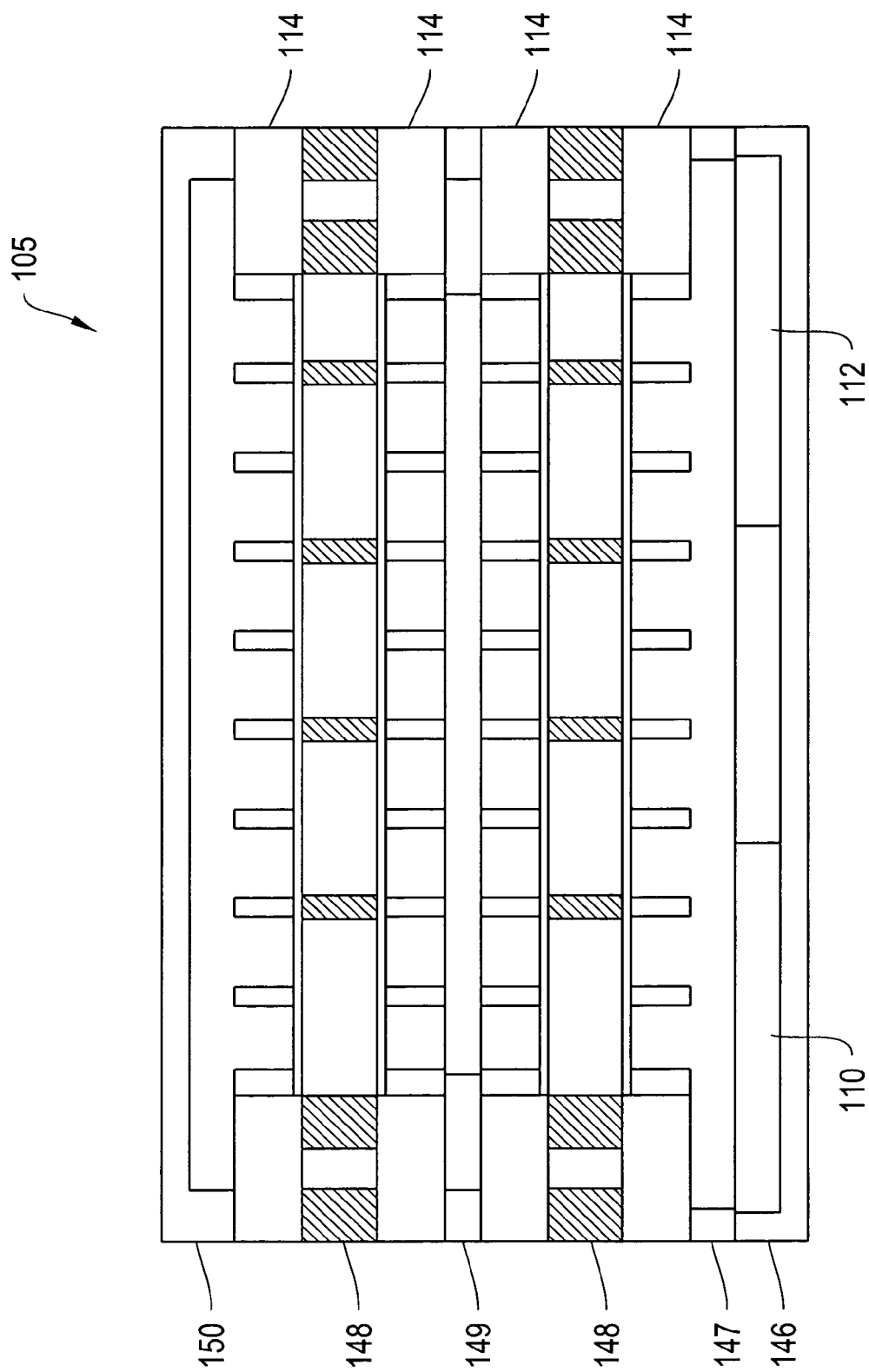
FIG. 4 is a cross-sectional side view of another fuel cell apparatus according to an illustrative embodiment of the invention.

FIG. 4 shows another embodiment of the present invention, in this case a larger fuel cell apparatus 105 employing four different membrane layers. Each layer, whether a fuel cell membrane 114, an air or oxygen routing layer 148, or fuel routing layer 147, 149, 150, is about 0.5 mm or less of thickness, such that the total stack is about 4.8 mm in height. FIG. 4 also includes within its housing a fuel reformer 110 and a tail gas burner 112 constructed as part of layer 146. The fuel routing layers carry fuel out of the fuel reformer past their respective fuel cell membranes and/or carry exhaust into the tail gas burner after passing their respective fuel cell membranes. Using FIG. 4, the average spacing between membrane layers, defined as the total integrated fuel cell apparatus height (4.8 mm) divided by the number of membrane layers (4) can be calculated. The average membrane spacing of FIG.

4 is therefore about 1.2 mm. In this case the power density can be derived by dividing the average power density of each fuel cell layer (0.4 W/cm$^2$) by the average membrane spacing, resulting in a power density of about 3.3 W/cc.

Construction of the fuel cells stack to enable greater than about 2 watts of electrical energy per cubic centimeter of integrated fuel cell apparatus volume is preferable. It is also desirable to operate a given fuel cell stack in such a way to produce greater than 2 W/cc. The power produced by a fuel cell can be controlled by varying the voltage, as well as by varying the temperature of the fuel cell. Larger fuel cells are typically operated at voltages above maximum power in order to increase the efficiency of the chemical to electrical energy conversion. Power densities greater than 1 W/cc, 1.5 W/cc, or preferably 2 W/cc, are included in the present invention.

Increasing the voltage to a level which lowers the power out below about 2 W/cc actually lowers overall system efficiency in small systems because insufficient heat is produced to maintain the required temperatures. The integration of a catalytic converter or tail-gas burner allows for some decrease in fuel cell power output.

One significant power density improvement is achieved through closer vertical spacing between membranes. The average spacing between membranes in the existing art is in the range of 2.5 to 4 mm, while the average spacing in the invention typically is less than about 1.5 mm, approaching values as small as 1.0 mm. The advantage of closer membrane spacing is derived from two advantageous structural features: a) the use of mechanically robust composite membrane designs, and b) the use of structurally simple flow routing layers that are enabled by the use of in-plane stacking. In this embodiment, advantageous use is also made of the architecture of in-plane fuel cell stacking. In-plane fuel cell stacking makes possible a number of structural advantages that together act to reduce the spacing between membranes and increase the power density to values well in excess of 2 W/cc.

The use of composite membrane structures has been described in co-owned International Publication No. WO 2005/030376. Briefly, composite membrane structures make possible the combination of a strong structural support member in combination with thin (<2 μm) YSZ membrane layers. Such a structure has the strength to withstand the stresses of thermal cycling without the need for excess substrate thickness and can be achieved using silicon wafer thicknesses of about 0.5 mm or thinner. Similar composite structures can be built from dense ceramic substrates, for instance $Al_2O_3$ materials, regardless of coefficient of thermal expansion, to the extent that they obey the design rules laid-out in the above-identified patent application.

In known layer fabrication techniques, a gas-impermeable bipolar plate is required to separate gas flows between fuel and air. A vertical planar stack requires that electrical contact be made from the anode of one membrane layer to the cathode of the adjacent layer. However, the fuel that passes over the anode must not be allowed to mingle with the air that flows over the cathode. Therefore an electrically conductive bipolar plate is typically employed which effects not only the electrical connection between layers but also the routing of fuel to the anode, air to the cathode, and a hermetic separation between the gas flows.

Returning to FIG. 1, no such gas separation is required in the flow routing layers as the cathode of fuel cell membrane 14 directly faces the cathode of fuel cell membrane 16. Both membrane layers share the same gas flow and no electrical connection is required between these two fuel cell layers. Therefore, the design of the flow routing layer is simplified and extremely thin flow routing layers are possible, with thicknesses in the range of 0.3 to 0.5 mm.

Figure 5:
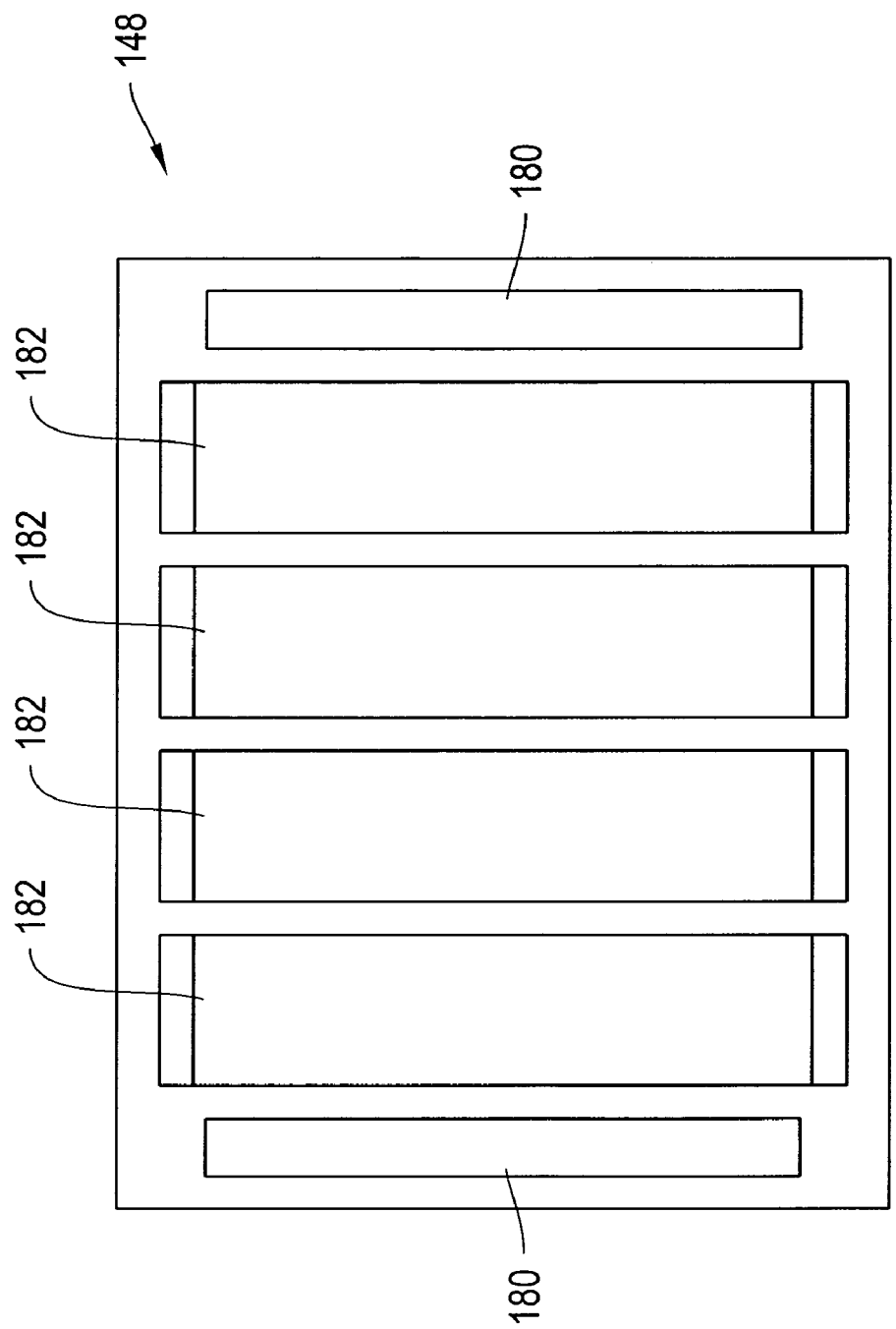
FIG. 5 is a schematic drawing of flow routing layer suitable for use with a fuel cell apparatus according to an illustrative embodiment of the invention.

FIG. 5 illustrates one such flow routing layer, having geometry compatible with the four layer fuel cell stack shown in FIG. 4. Openings 180 provide for vertical passage of the fuel from one layer of the stack to layers above or below. Channels 182 provide for the flow of air over the cathode. To the extent that flow routing layer 148 separates two cathode-facing layers, only a simple ribbed structure is necessary to add both structural rigidity to the stack and provide for sufficient distribution of air over all cathode surfaces.

The flow routing layer can be composed of a rigid material such as silicon. Choice of silicon in this embodiment has the further advantage of matching the structural materials between all of the membrane layers and the flow routing layers. In this fashion, one can avoid the stresses associated with differing thermal expansion coefficients between these two structural materials.

The flow routing layer can be machined or stamped from a metallic material. However, the coefficient of thermal expansion of the flow routing layer must remain substantially similar to that of the structural material in the membrane layer. Thin metallic flow routing layers will not be as rigid as a routing layer built from silicon, but the silicon or other ceramic material employed for the membrane layer will provide more than enough rigidity and provide sufficient strength to the overall stack to withstand the stresses of thermal cycling.

Heat Generation/Insulation

In addition, to maintaining electrical power output above about 2 W/cc, system performance and size are also improved if the thermal heat generated is maintained above 2 W/cc. Due to the rapidly increasing surface area at the small sizes, it is desirable to maintain a sufficiently high heat density in order to maintain the operating temperature of the device. If the fuel cell apparatus alone does not produce enough heat, using a tail gas burner to combust extra fuel in order to maintain greater than 2 W heat per cubic centimeter is advantageous for efficient device operation. Ensuring that the device will be operated at greater than 2 W heat per cubic centimeter allows the insulation thickness to be minimized, thereby producing a device which is commercially competitive with existing batteries.

Design of the insulation volume in the solid-oxide fuel cell system is another area for improving solid-oxide fuel cell efficiency. Fibrous or micro-porous ceramics have been utilized for the function of isolating the high temperature housing from the outer package and its environs while minimizing the amount of waste heat that is lost by conduction through the insulation. Aerogel materials are available, for instance, which possess low thermal conductivities and are stable for operation at 800° C. as low as 0.04 W/m-K.

Perhaps the most space-efficient insulation, particularly for small packages, is a vacuum insulation. This allows portions of the fuel cell apparatus to function as a thermos bottle with the outer walls and insulating volume maintaining the contents integrated within the housing at a desired temperature. By maintaining total gas pressures in the insulating volume of less than 100 mtorr, preferably less than 20 mtorr, more preferably less than 10 mtorr, it is possible to substantially eliminate any thermal loss by means of conduction away from the housing through the gas phase. A partial vacuum may be formed within the insulating volume bounded by the outer wall by evacuation with a vacuum pump, through an outgassing port, or alternatively, by performing the process of sealing-together the elements of the outer wall within an evacuated 20 atmosphere.

When utilizing the embodiment of a vacuum package, and eliminating use of a thicker solid insulation material such as aerogel, a new type of thermal loss from the housing becomes an issue in the form of thermal loss by means of infrared radiation. Infrared radiation emanating from the surfaces of the housing can become, in fact, the dominant heat loss mechanism for the insulation package illustrated in FIG. 1.

There are at least three methods for reducing the thermal loss by radiation, any one of which may be used singly or in combination. These can be seen by returning to FIG. 1. First, a reflective coating is applied to the outer surfaces of the integrated fuel cell apparatus, reducing thereby the infrared emissivity and power loss from the hot surface. Second, a radiation reflector 40 can be provided along the inner surfaces of the vacuum outer wall 30 for the purposes of returning infrared radiation back to the integrated fuel cell apparatus. This radiation reflector can be constructed by means of a metallic coating which is deposited on the inner surfaces of the outer wall 30, or by means of a metallic or infrared reflective material which is mechanically attached to the inner surfaces of the vacuum wall. In addition, a series of parallel infrared reflectors can be provided between the hot surface of and the cold surface of the outer wall.

Fuel Cell Apparatus Regulation, Monitoring, and Safety

As discussed above, integrating a fuel reformer, a fuel cell and a tail gas burner within a substantially isothermal zone improves the efficiency of the fuel cell apparatus and makes it a suitable battery replacement device. Although the increased energy density of a battery replacement improves the commercial value, localizing a large amount of chemical and thermal energy in a small volume increases the likelihood of uncontrolled combustion, explosion, and/or the release of harmful chemicals. Because many of the devices disclosed herein are suitable for use by consumers, e.g., a cellular telephone battery replacement, it is desirable to incorporate safety and device monitoring features in the fuel cell apparatus.

Although not always expressly emphasized in the description of the embodiments provided above, many of the structural and chemical flow aspects of the invention as previously disclosed herein inherently enable the safe operation of the fuel cell apparatus. For example, while the insulating volume discussed above increases the energy density in the isothermal zone, by containing the heat, the insulating volume also shields the users of the device from excess heat. Simultaneously, the insulating volume can serve as a capture zone to stop any uncontrolled combustion and act as a means for terminating fuel conversion reactions should the insulating volume be breached or otherwise penetrated. These and other safety features are discussed in more detail below.

There are multiple design strategies for improving the safety of a fuel cell apparatus, in general, and portable solid-oxide fuel cell devices, in particular. However, for organizational purposes, the safety features can be grouped into two broad categories, noting that various embodiments may include features that place them in both categories. First, there are passive design structures and methods, such as the heat containing benefits of the insulating volume. Some passive safety features operate persistently in the background and respond to apparatus changes without the need for directed activation. For example, the design aspects of fuel cell apparatus geometry to control combustion propagation represents another passive safety feature.

The second category of safety features includes active methods and devices. An exemplary active safety feature is an electronic control system that terminates device operation in response to some event, such as sensor alarming when a conduit is blocked, and appropriately initiating a combustion termination instruction in response to the alarm. Generally, control system/sensor systems fall into the active safety feature category.

Again, although the terms passive and active are used, it is understood that they are used for organization purposes and are not intended to limit the scope of the description or claims. Thus, although described as active or passive, various safety features may include both active and passive elements without limitation.

Prior to discussing each safety feature in greater detail, it will be useful to introduce the different active and passive device and method embodiments that may be integrated with the fuel cell apparatus disclosed herein. As combinations of these different features, as well as the other embodiments discussed herein are possible, a broad range of fuel cell apparatus can be fabricated by those skilled in the art.

Some of the passive safety features include: insulating volumes and other forms of device insulation; regulating conduit diameters to restrict the emission of volatile compounds; regulating thermal energy levels in the device through the choice of structural materials; arranging device components, such as the fuel reformer and tail gas burner, to enable self-regulating temperature levels that control fuel conversion reactions; regulating various device geometries such as the diameters of various flow streams and conduits to control combustion propagation; and incorporating device components, such as a tail gas burner, to provide substantially non-volatile exhaust by pre-reacting volatile fuels and/or fuel conversion byproducts.

In turn, some of the active safety features include: integrating mechanical and/or electronic sensors to monitor the operation of the fuel cell apparatus and its sub-systems; using control elements, such as shut off valves, to terminate device operation in response to an alarm; control systems that incorporate sensors and control elements to prevent unsafe device operation; authentication devices to verify the suitability of a given fuel source for use with the fuel cell apparatus; and various circuits to provide for identification, authentication, control, monitoring, and operation of the fuel apparatus and its components.

Therefore, the invention further includes features that provide "fail safe" operation such that any indicia of device failure or atypical operation triggers a shutdown of some or all components of the device. Thus, effects of a potentially disastrous failure are reduced by terminating device operation in advance of an energy release. Conversely, passive techniques that operate in the background during operation to increase safety, such as insulating foam that protects the user from heat, are also within the scope of the invention.

Figure 6:
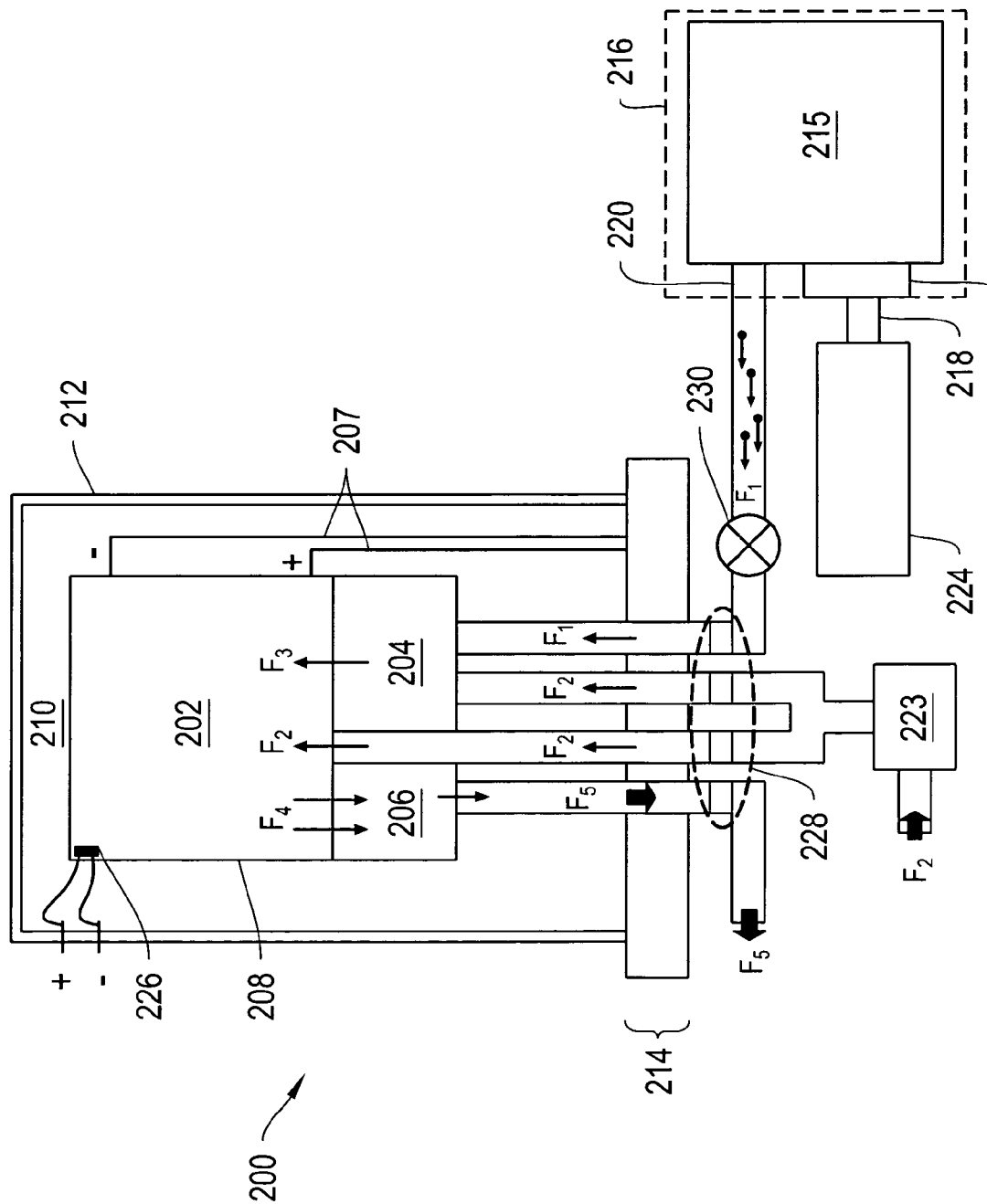
FIG. 6 is a schematic diagram of a fuel cell apparatus incorporating various safety features according to an illustrative embodiment of the invention.

FIG. 6 illustrates a schematic diagram of portions of an embodiment of a fuel cell apparatus 200 incorporating various active and passive safety features. A solid oxide fuel cell 202, a fuel reformer 204, and a tail gas burner 206 are in fluid and thermal communication with each other. A portion of the collection circuit 207 used to collect the electricity produced from the fuel cell 202 is also shown. Additionally, all three components are integrated together within a housing 208 in an isothermal zone that is bounded, in part, by an insulating volume 210. In turn, the insulating volume 210 is defined, in part, by an outer wall 212 of the fuel cell apparatus 200 and portions of the fluidic manifold and device packaging 214.

The volume of the housing can range from about 0.5 cc to about 100 cc. In one embodiment, the volume of the housing ranges from about 0.5 cc to about 10 cc. In another embodiment, the volume of the housing ranges from about 1 cc to about 5 cc. Additionally, the insulating volume is less than or equal to about 200 cc.

Fuel 215 is typically contained within a fuel tank or fuel cartridge 216. The fuel tank 216 can further include a fuel tank electrical connection 218 and a fuel tank fluidic connection 220, the fuel tank 216 also can include an authentication circuit 222 in communication with the fuel tank electrical connection 218 or as an independent, addressable device. An air pump 223 can also be integrated with the fuel cell apparatus 200 to provide air necessary to sustain combustion with the isothermal zone. One or more device control systems 224 can be included to receive and operate in response to sensor data and/or circuit inputs/outputs.

Various conduits and conducting elements can be used to facilitate the flow of fuel, air, combustion by-products, and other compounds to and from the fuel cell apparatus. As various conduits and transport mechanisms can be used, it is useful to illustrate the flow streams or paths rather than specific structures. However, suitably sized conduits, channels, or other fluid transport structures can be used to contain the flow streams as known to those of skill in the art.

Thus, various flow paths/streams $F_1$ through $F_5$ are depicted in FIG. 6. Flow path $F_1$ illustrates the flow of fuel 215 into the device while flow path $F_2$ illustrates the introduction and flow of air into the device. In turn, flow path $F_3$ illustrates the mix of air and processed fuel leaving the fuel reformer 204. After the initial reaction in the fuel cell 202, chemical compounds and reaction by-products flow to the tail gas burner 206 along flow path $F_4$. Finally, after processing by the tail gas burner 206, thermal energy and substantially non-volatile exhaust flows from the apparatus 200 along flow path $F_5$.

In part, the invention provides techniques for regulating the operation of a solid oxide fuel cell by controlling where different reactions occur within the apparatus. In one embodiment, fuel is converted to hydrogen and by-products at a reaction temperature $T_1$ within the fuel reformer. The reaction temperature is within a reaction temperature range. For example, as discussed below in FIG. 8, the reaction temperature range for butane is from about 200° C. to about 800° C. The by-products are converted to exhaust products and thermal energy. If the exhaust products are non-volatile such as water, oxygen, and/or carbon dioxide, they flow from the device along flow path $F_5$.

If volatile compounds are still detected along flow path $F_4$, the tail gas burner can further clean, for example by substantially complete oxidation, the exhaust flow before it enters the environment. In addition, the thermal energy from the step of converting the by-products assists in maintaining the reaction temperature range. As a result, the different device components within the isothermal zone can be used to pre-heat incoming fuel and maintain the temperature of the fuel reformer. Consequently, each component can act as a control element to terminate or initiate fuel conversion.

Returning to FIG. 6, a control system/control circuit 224 can be used to interface with the authentication circuit 222 of the fuel tank 216. In one embodiment, the control circuit 224 also receives data relating to the operation of the fuel cell apparatus 200 and regulates the operation of the fuel cell apparatus in response to that data. A temperature sensor 226, a flow sensor (or sensors) 228, pressure sensors (not shown), and other sensors and detectors can be incorporated within and exterior to the various components of the fuel cell apparatus to monitor various operational parameters. An electrically/mechanically controlled flow valve 230 may be associated with the fuel conduits or may be part of the fuel cartridge. Suitable sensors can include, but are not limited to, a fluid flow detector, a chemical detector, a pressure detector, a comparator circuit, a voltage detector, a current detector, a direct mass flow rate detector, an indirect mass flow rate detector, a volume flow detector, a differential detector, a temperature detector, a radiation detector, and combinations thereof.

The control system can send and receive apparatus data via various electrical connections not explicitly depicted in the diagram. Thus, the apparatus may start to operate irregularly and pose a risk to a user. The control system may identify the irregularity via a temperature data, flow data, pressure data, preset data, or other data. In response, the control circuit can send an electric signal to a flow valve or another fuel cell device component, such as the fuel reformer, to stop fuel conversion. Thus, for a valve-based system, the control system instructs the valve to close and terminate the flow of fuel to the fuel reformer. Suitable apparatus data can include, but is not limited to, temperature data, fluid flow data, pressure data, radiation data, electric signal data, electric current data, voltage data, geometric data, structural stability data, vibration data, sheer stress data, chemical composition data and combinations thereof.

The sensors, conduits, valves, controls, and circuits may be located in various positions in the system as would be obvious to one skilled in the art. For example, the fuel flow sensor may be located upstream of an electrically controlled valve rather than downstream as shown in FIG. 6. Additionally, although the various electrical connections are not shown between the electronic control circuit and the various sensors, valves and pumps, the appropriate connections can be achieved through various conduits, semiconductor tracings, microfluidic channels and wire based connections as known to those of ordinary skill in the art.

Various sensors known to those of ordinary skill in the art are incorporated in the apparatus in different embodiments. In particular, suitable sensors include, but are not limited to thermocouples, unsheathed fine wire thermocouples, Type R, 0.001" diameter, such as model number P13R-001, made by Omega Engineering, Inc.; platinum resistive temperature detector (RTD) such as model number WS81 (Omega Engineering, Inc., One Omega Drive, Stamford, Conn. 06907-0047, USA); and flow rate sensors, MEMS flow sensors such as model D6F (Omron Electronic Components, 55 Commerce Drive, Schaumburg, Ill. 60173 USA).

Sensors can be positioned to directly detect a particular parameter of interest or indirectly positioned to capture data from different sources. A thermal sensor can be positioned to capture indirect heat that propagates along a flow path, even though it is integrated in the device to measure the temperature of the originating heat source.

Various sensors and control elements useful in the invention include, but are not limited to, a fluid flow detector, a pressure detector, a comparator circuit, a voltage detector, a current detector, a direct mass flow rate detector, an indirect mass flow rate detector, a volume flow detector, a differential detector, a feedback loop, a temperature detector, a radiation detector, a valve, a unidirectional flow device, a gasket, a seal, a gate, a membrane, an iris, an occluder, a vent, a conduit, and combinations thereof.

Figure 7A:
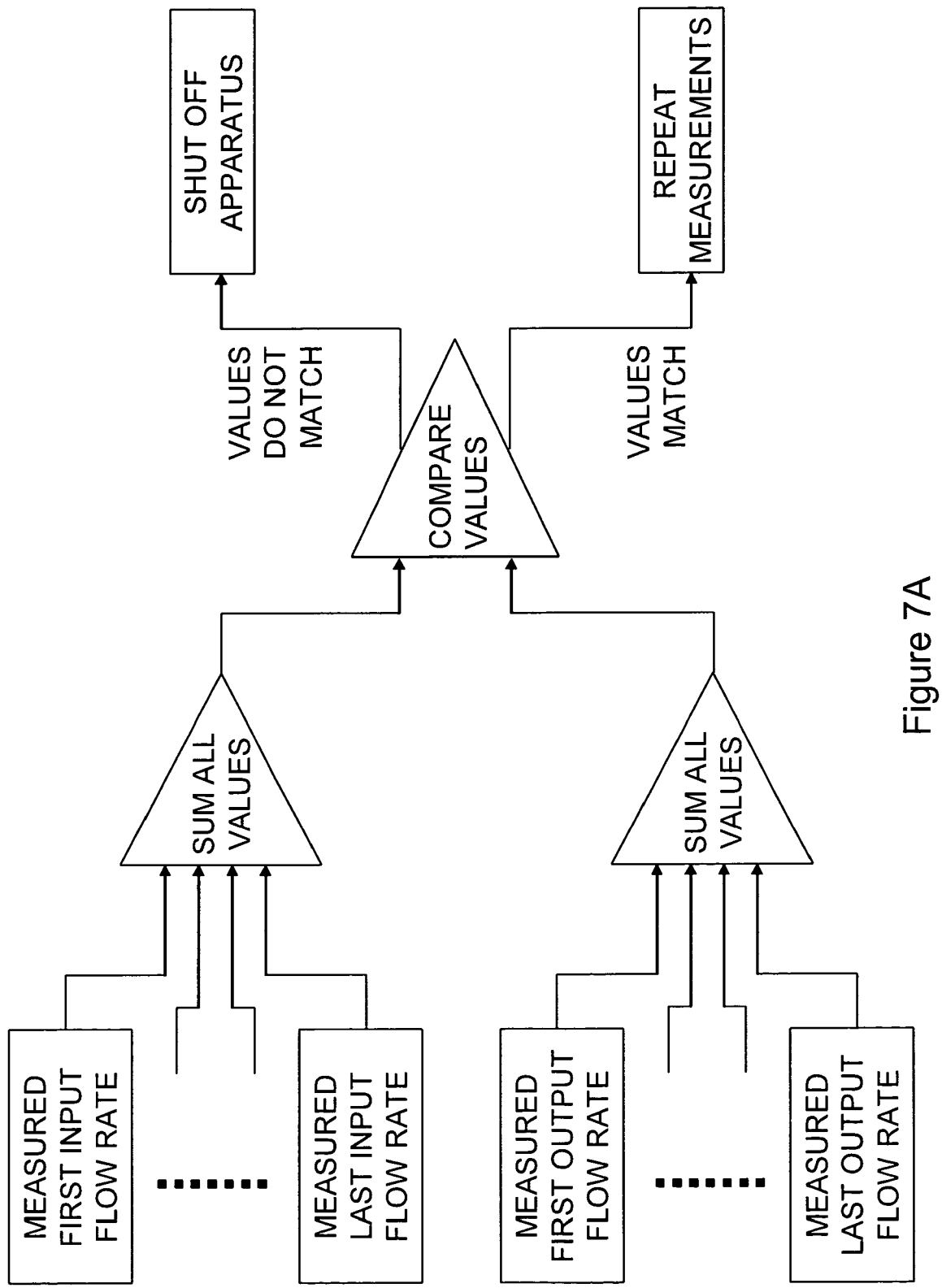
FIGS. 7A, 7B and 7C are schematic drawings illustrating control flows for regulating a fuel cell apparatus according to an illustrative embodiment of the invention.
Figure 7B:
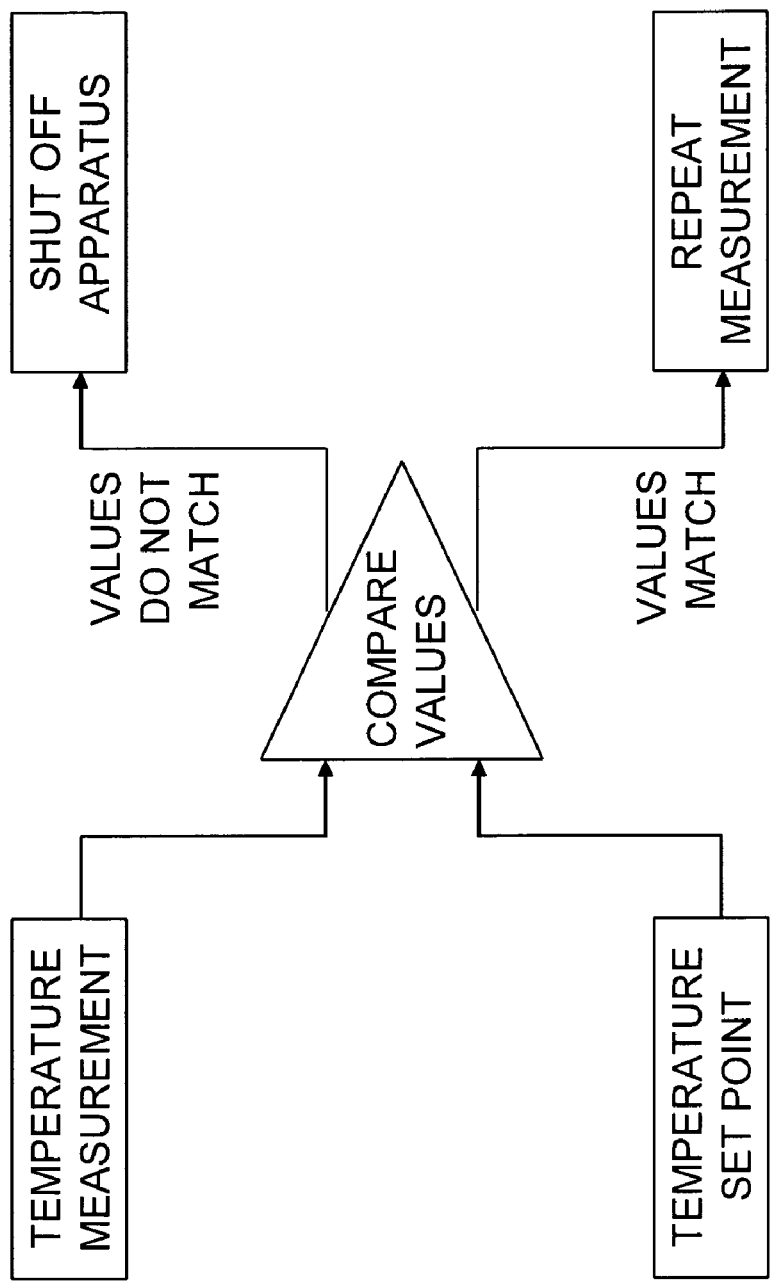

The control system(s) represent an active design solution for ensuring safe operation of the fuel cell apparatus. FIGS. 7A and 7B illustrate control flow diagrams that regulate device operation in response to flow data and temperature, respectively. The control flow in FIG. 7A relates to a device where fluid flow sensors are added to all input and output fluid streams which are connected to the isothermal zone. An electronically controllable valve is also included that controls the flow of fuel into the fuel reformer. An electronic circuit such as a comparator circuit or other suitable circuit that compares the total incoming flow to the total outgoing flow is incorporated within the overall control system. As shown in FIG. 7A, if the flows do not match, then a component in the fuel cell apparatus may be malfunctioning. The control system automatically addresses electronically the fuel valve, causing it to close and restrict or cease the flow of fuel. The blockage of the flow path prevents any continued, unsafe release of fuel and isolates the fuel source from the isothermal zone. The blockage also prevents further fuel conversion and the creation of additional thermal energy.

In one embodiment, the mass flow rate of the output and input streams are substantially equal in normal operation. However, the volume flow rates may be different even in normal operation, e.g., due to chemical reactions or temperature changes. The flow sensors can be direct or indirect mass flow sensors, although other sensors can be used as appropriate. In other embodiments, the flow sensors are volume flow sensors, and the electronic circuit corrects for the expected difference in volume flow rate. Of course, both mass and flow sensors can be used together.

In FIG. 7B, another control flow suitable for use with a control system to regulate the fuel cell apparatus is illustrated. The control flow described in FIG. 7B is suitable for use with the device embodiment depicted in FIG. 6 to the extent that the device includes a control system, a controllable valve, and a temperature sensor. The temperature sensor is used to measure the temperature in the isothermal zone that includes at least one of a fuel cell, a fuel reformer, and a tail gas burner. A preset temperature or temperature range can be determined for the device during operation. Additionally, temperature presets can be determined for various individual device components such as the fuel reformer, the fuel cell, and the tail gas burner. The temperature preset can be calculated based on where the sensor is positioned, the levels of intervening insulation, the type of fuel being used, and other relevant factors.

As shown in the control flow in FIG. 7B, the actual temperature in the isolated thermal region or other area of interest within the apparatus and the predetermined temperature preset are compared. If the values match, the device is deemed in a normal operation state and the measurement is repeated. In one embodiment, a range of acceptable values are allowed such that an exact match with the preset value is not required. However, if the temperature measurement and the preset temperature are substantially different, the control system restricts the flow of fuel or otherwise terminates device operation. Other active control flow approaches that make use of a sensor, a control system, and a fuel regulating element are also within the scope of the invention.

In addition to the control systems and sensor-based approaches described above, additional safety features can be incorporated in the fuel tank interface portion of the apparatus. As discussed above with respect to device embodiment of FIG. 6, a disposable or refillable fuel source, e.g., a fuel tank or a cartridge, can be fabricated to include authentication circuitry or mechanical interface portions to regulate delivery of fuel. Thus, if a particular fuel cell apparatus is only designed to work with butane from a certain vendor, the interface of the fuel cell apparatus may be designed with a particular geometry that will not allow a standard butane fuel tank or a fuel tank containing another type of fuel to interface with the fuel cell apparatus. Fuel tank/fuel cell apparatus interface controls can be implemented using a mechanical lock and key model wherein certain interface portions on the tank and the apparatus must fit together to enable fuel delivery. Patterns of raised and lowered interface pins and grooves can also be used to accomplish these access controlled fuel delivery objectives.

Alternatively, electrical contacts can be integrated into the fuel tank with associated circuitry that connects to corresponding contacts and circuitry in the fuel interface portion of the fuel cell apparatus. The circuitry portions on both the tank and/or the fuel cell apparatus can communicate with each to authenticate the fuel tank source and determine if fuel delivery should be allowed from the tank. If the fuel tank is not properly authorized, then the fuel apparatus can electronically block fuel delivery by engaging or failing to release a flow valve and allow fuel to pass into the apparatus. The fuel cell apparatus can electrically query the fuel cell cartridge and interpret the passive or active response signal. Alternatively, functional portions of the fuel cell control circuitry may be located in the fuel cell cartridge, for example firmware or software. As a result, a user can ensure that the fuel cell cartridge is an authorized safe cartridge.

Integrating circuitry, either within the control system or within the interface portion of the fuel cell, also allows the fuel cell apparatus to measure the contents of the fuel tanks and report how much fuel is remaining. Thus, inclusion of suitable circuitry allows the fuel cell apparatus to report via a graphic display or other alarm element how much fuel remains or that fuel will be fully consumed within a specified period, given the current usage level. The control system and/or various electrical components can monitor fuel consumption through use of a mass flow sensor. The flow rate can then integrated over time, or sampled at fixed time intervals and stored, in order to determine the amount of fuel consumed. This information can be periodically written to memory in the fuel cell cartridge to maintain an accurate account of the fuel remaining in the cartridge.

Figure 7C:
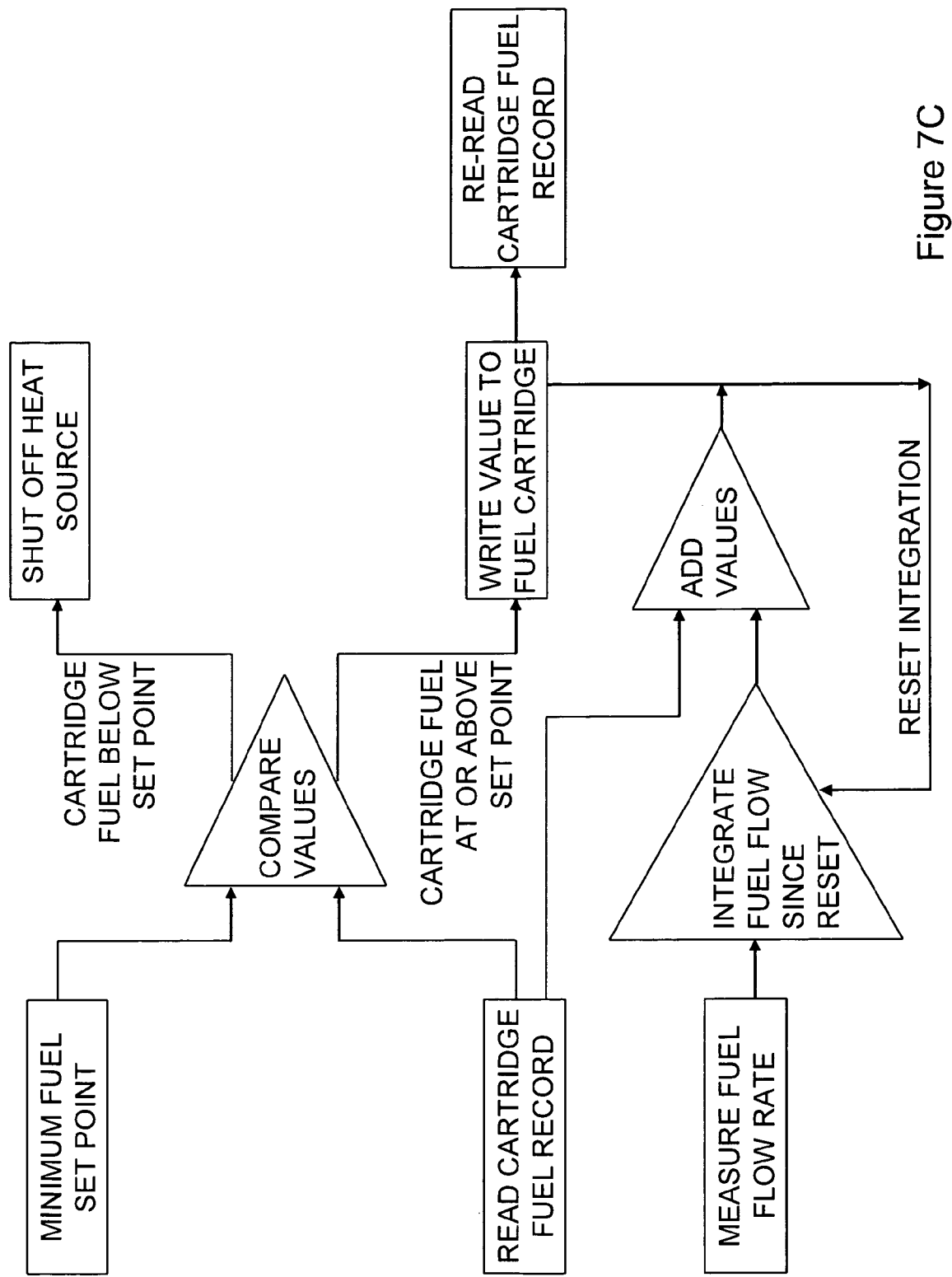

The fuel tank or fuel cell cartridge can also include an electronically writable or reconfigurable counter device. This counter device is modified by the fuel cell system as fuel is used by the system. As such, the amount of fuel drawn from the cartridge and/or the amount of fuel remaining in the cartridge can be tracked. This information helps safeguard the user by ensuring that the fuel cell does not attempt to operate when insufficient fuel is available. Thus, in one embodiment a fuel reserve level can be preset. Therefore, once a control element or circuit reports that the fuel source is at the fuel reserve level, fuel cell apparatus operation can be reduced or terminated. The counter device can also be used for billing purposes regarding fuel consumption. This feature can be combined with those embodiments discussed above to relating to an authentication system that shuts down the apparatus if a potentially unsafe cartridge is connected. An exemplary control flow relating to a fuel consumption record embodiment is shown in FIG. 7C.

Some of the control system sensor based approaches discussed above can also be modified to ensure that non-toxic and/or non-volatile compounds are vented from the fuel cell apparatus as exhaust. The objective of producing substantially non-volatile exhaust can be achieved using both passive and active approaches. In the active approach, the incoming air, incoming fuel, and exhaust flow rates are measured. These different flow rates are then compared electronically to determine if substantially all the fuel being released from the fuel storage device is being processed and exhausted by the fuel cell device. If excess fuel is being released, a determination that unprocessed fuel is being vented as exhaust can be made, and the device can be shut down or the amount of fuel delivered from the tank can be adjusted as necessary.

It is also possible to passively process the fuel stream using the existing fuel cell apparatus components to limit a user's exposure to thermal energy and undesirable chemicals in the device's exhaust. If combustion products are allowed to exit the device through an exhaust stream, a user of the device may be exposed to toxic or explosive compounds. Therefore, it is desirable to ensure that fuel cell apparatus exhaust has been scrubbed via supplemental heating to reduce the levels of dangerous compounds.

To prevent any of the input fuel, e.g., butane, from making it through to the exhaust, the tail gas burner and/or fuel cell oxidize or combust all of the exhaust to produce primarily water and carbon dioxide. Such scrubbing also prevents the exhausting of any intermediate by-products from a fuel reformer, such as hydrogen, carbon monoxide, formaldehyde or methanol. The oxidation process also produces heat, as discussed earlier in this specification. The oxidation can occur, for example, in a separate tail gas burner, or as part of the operation of the fuel cell. Other heat producing reactions other than combustion or oxidation that can occur within the fuel cell apparatus are also within the scope of the invention. The excess heat produced by these device components can be used to maintain the reaction temperatures as discussed herein and ensure substantially all vented by-products are rendered non-volatile.

Another type of device failure can occur if the tail gas burner malfunctions while the fuel reformer continues to operate, causing the exhaustion of various intermediate fuels, some of which may be toxic. The invention integrates the fuel cell with the fuel reformer and the tail gas burner such that the heat from the tail gas burner or the fuel cell apparatus is used to maintain the operation of the fuel reformer. Such operation is achieved by balancing the heat loss through the surrounding insulation with the heat generated by at least one of the fuel cell, the tail gas burner and the fuel reformer. During normal operation, sufficient heat is available to maintain the fuel reformer above a minimum operating temperature. However, in the case of a tail gas burner failure, less heat is available. As a result, the fuel reformer temperature will drop below a maximum "off" temperature and fuel conversion will cease. (e.g., the temperature details in FIG. 8 relating to butane).

As a result, this temperature drop can stop or substantially reduce the production of intermediate products. Therefore, the arrangement of device components provides a self regulating temperature control system such that if one or more components fail, insufficient heat is maintained to drive the fuel conversion reaction. Therefore, a device component failure shuts down the device before any harm occurs to a user. This feature, in combination with the control systems described above with respect to FIG. 6, allows for the fabrication of safe battery replacements using solid oxide fuel technology.

Figure 8:
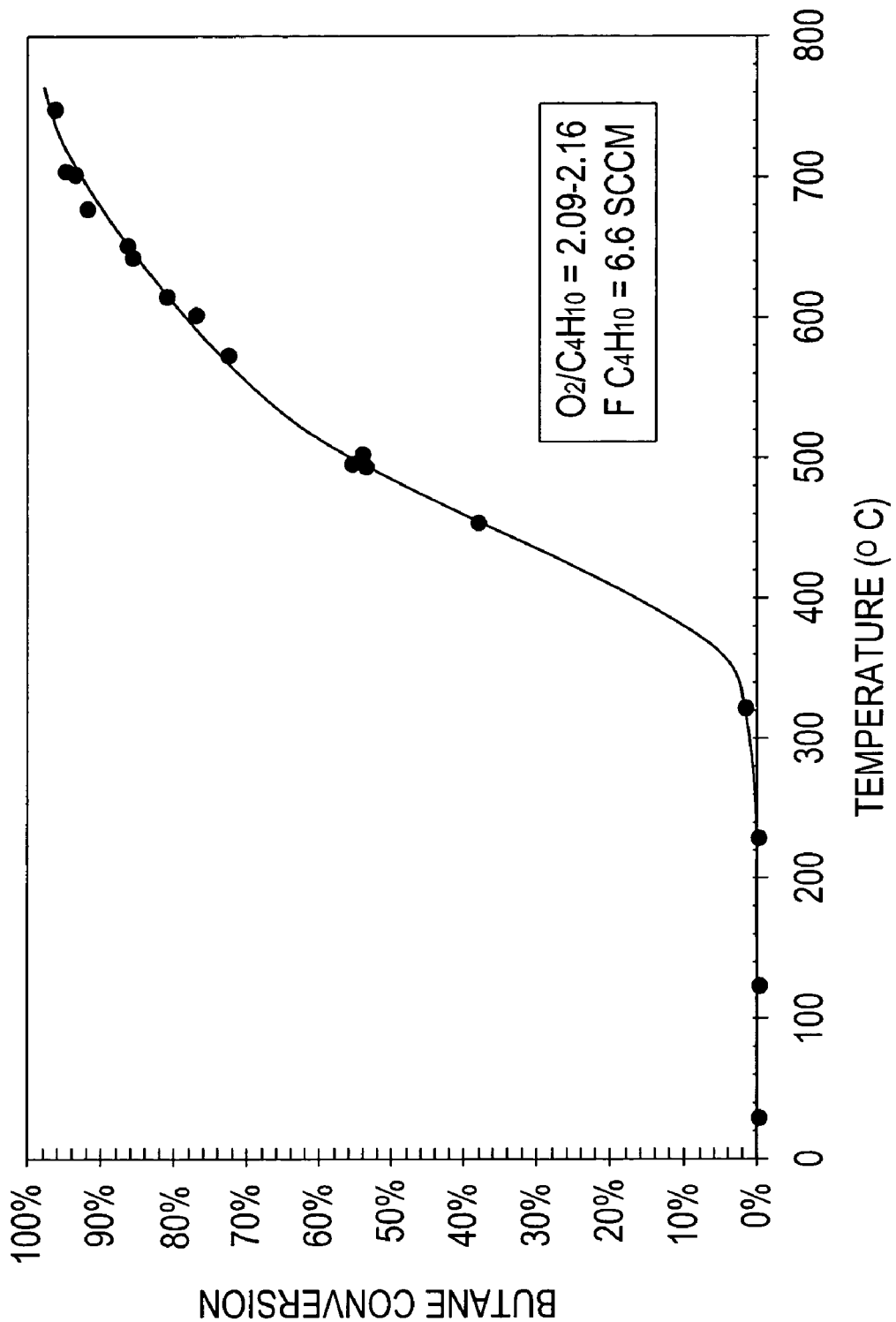
FIG. 8 is a graph of butane conversion as a function of temperature suitable for setting temperature presets and reaction temperature ranges to regulate an embodiment of the invention.

FIG. 8 shows some of the temperature characteristics for converting butane into energy in a fuel cell apparatus. Specifically, FIG. 8 illustrates a data graph of butane conversion versus temperature showing efficient operation above roughly 500° C., and nearly zero conversion below roughly 300° C. The specific temperatures are geometry dependent and chemistry dependent (e.g. methanol conversion would have a lower pair of temperatures). However, the graph suggests that knowing which temperatures levels result in the cessation of energy conversion allow the reaction temperature ranges to be used as self limiting reaction control parameters. As a result, these temperature ranges can be selectively used to turn the apparatus on and off as part of a safety control system or during normal operation.

A fuel reformer within a particular fuel cell apparatus can be tailored to process a specific fuel or class of fuels. Thus a fuel reformer can be adapted to process butane as an input product that it partial oxidizes into hydrogen and carbon monoxide. For this butane partial oxidation embodiment, significant conversion occurs at 500° C., and more preferably 600° C., 700° C. or 800° C. In contrast at lower temperatures such as below 400° C., little to no conversion occurs for this butane specific embodiment. Furthermore, for the butane adapted fuel reformer, operation at or below about 300° C., about 200° C. or about 100° C. results in further decreases in fuel conversion. An alternate embodiment is based upon the steam reforming of water and methanol into hydrogen and carbon dioxide. In such a methanol steam reforming embodiment, minimum "on" temperatures are typically 200° C., 250° C., 300° C., and 350° C. while maximum "off" temperatures are typically 200° C., 150° C., 100° C. or 50° C. Thus, when a portion of the device fails or the apparatus is otherwise cooled to one of these ranges, fuel conversion is terminated. In addition, to the temperature controls described herein other passive approaches are also possible.

A mechanical break in a conduit, a seal, or a wall portion of the fuel cell apparatus may expose the hot zone or hot reaction by-products to the external user or environment. One embodiment of the present invention uses a reduced pressure in the insulating volume. In this embodiment, a mechanical break necessarily causes an increase in pressure within the insulating volume as the partial vacuum dissipates. In turn, this pressure change in the insulating volume causes a dramatic increase in heat lost from the housing which includes at least one of a fuel reformer, a fuel cell and a tail gas burner. In one embodiment, the geometry of the insulating volume is such that the thermal conduction at reduced pressure is sufficiently low such that the housing is maintained above a minimum operating temperature. As discussed above, this minimum temperature is necessary to sustain the fuel conversion reaction. Therefore, when the insulating volume is at or near atmospheric pressure, and insulating benefits cease, more heat is conducted away from the housing. This heat loss and the associated cooling of the housing below a maximum non-operating or "off" temperature prevent the fuel cell from operating.

The "off" temperature may be selected to meet a variety of safety or operational requirements, for example the temperature may be sufficiently low such that it provides minimal risk of injury. This can be achieved by setting temperatures levels wherein no explosion can occur via ignition, or alternately the "off" temperature may be selected such that no toxic intermediates can be formed. Therefore, the insulating volume temperature controls and reaction temperature requirements eliminate the risk of heat from an operating device reaching a user if a mechanical breach in the device packaging occurs.

An apparatus failure can also occur as a result of a large temperature spike due to small changes in the fuel flow rate, or a decrease in fuel cell efficiency. In an embodiment with a solid insulator, the temperature is approximately linearly proportional to the heat produced. For example, if a system is constructed to operate at 800° C. with 4 watts of heat input, and the heat input grows to 5 watts, then the temperature may rise linearly to 1000° C. This 200° C. increase in temperature can cause dangerous failure conditions, such as material melting. In the present invention, the use of a reduced pressure insulating volume, (rather than solid insulation) and the optional use of low conductance tubes and electrical connection elements, results in the primary heat loss mechanism being thermally induced radiation.

The magnitude of heat lost through thermal radiation is proportional to the fourth power of absolute temperature. As a result of this super-linear dependence, a small increase in heat input only results in a small increase in temperature. For example, if thermal radiation is the only heat loss mechanism in a device constructed to operate at 800° C. with 4 watts of heat input, and the heat input grows to 5 Watts, then the temperature only rises to 862° C. This reduction in excess heat is a significant improvement with regard to both safety and efficiency. As such, for this additional reason, using a low pressure insulating volume allows for safe device embodiments that limit the risk of user's being exposed to thermal energy. In one exemplary embodiment, the invention relates to a self-limiting fuel cell device operating at a nominal temperature between 700 and 900° C. and packaged in a vacuum of less than 250 mT such that infrared emission is a significant heat loss mechanism.

When an apparatus enters a failure state or otherwise evidences irregular behavior, it is desirable to reduce the likelihood of combustion propagating from within the hot region through to the outer environment. Combustion propagation can be regulated by sizing the diameter of the fluid conduction elements that define the various flow streams in the device. Thus, the diameter of the fluid conduction elements, such as a flame arrester conduit, may be restricted to less than about 154% of the Maximum Experimental Safe Gap (MESG). For example, the National Fire Protection Association (NFPA) lists the MESG for hydrogen as 0.28 mm. Thus, in one embodiment the diameter of the fluid conduction elements range from about 0.05 mm to about 0.43 mm. The length of the fluid conduction elements can also be restricted such that the length is greater than about 150% of the diameter. These values are derived from experimental work such as that described in Britton, L. G., "Using maximum experimental safe gap to select flame arresters", *Process Safety Progress*, 19, 140-145 (2004).

When these geometric design requirements relating to conduit sizing are used to fabricate a device and a reduced pressure insulating volume is also incorporated, it becomes unlikely for a flame to propagate outside of the apparatus during a device failure event. Specifically, in the insulating volume, the reduced pressure/low oxygen level blocks propagation. In the fluid connections, the small diameter and sufficient length restricted geometries block combustion propagation. It is sensible to use the combustion geometry values for hydrogen because it is the most conservative case. However, more accurate values for the gas mixture present in the device are also anticipated. For example, the NFPA lists the MESG for butane at 1.07 mm.

Embodiments using the MESG for butane may have fluid conduction elements that range in diameter from about 0.05 mm to about 1.65 mm. If these approaches are combined with the other safety features listed above, many safe user friendly device embodiments are possible.

Additional Exemplary Device Implementations

The safety, control, monitoring, and authenticating methods and features discussed above can be incorporated in various exemplary systems and devices. Thus, e.g., different device implementations can incorporate the sensors, control systems, authentication circuits, and other features. Some exemplary device implementations that can further include the safety features discussed above are provided below.

In a first exemplary device implementation, the device relates to a fuel cell apparatus that includes a housing. The housing defines a substantially isothermal zone. As such, the housing integrates a fuel cell and a tail gas burner with the isothermal zone. The fuel cell and the tail gas burner are in thermal communication and share a common wall.

In a second exemplary device implementation, a housing integrates a fuel reformer and the fuel reformer is in thermal communication with the fuel cell. The fuel cell and the tail gas burner are arranged to produce a power density greater than or equal to about 2 W/cc. The fuel cell is a solid oxide fuel cell. Alternatively, the solid oxide fuel cell includes a membrane layer having a thickness less than or equal to about 500 μm, about 1 mm, or about 1.5 mm in other embodiments. The solid oxide fuel cell can include a plurality of fuel cells defining a plane thereby creating an in-plane fuel cell stack. While in another implementation, the housing includes two in-plane fuel cell stacks that are substantially parallel.

Different device implementations can include a low thermal conductance fluid connection element in fluid communication with the tail gas burner. In another embodiment, the low thermal conductance fluid connection element is a micromachined fluid conducting tube, a concentric tube, or a glass capillary tube. A low thermal conductance electrical element in electrical communication with the fuel cell is included in some embodiments of the invention. The low thermal conductance electrical element has a diameter less than or equal to about 50 μm in one embodiment. Alternatively, an insulating volume is disposed adjacent to an exterior of the housing in one embodiment. For devices having an insulating volume, the volume can include a reduced pressure, an insulating foam, a thermal reflector, or combinations thereof. One implementation further includes a heat recuperator in thermal communication with the fuel gas burner. Additionally, the heat recuperator can be located in the insulating volume.

In some implementations, the fuel reformer converts complex fuels such as butane into smaller molecules for more efficient utilization by the fuel cell membrane. In some aspects the terms fuel reformer and fuel processor can be used interchangeably as known to those in the art. Additionally, in some aspects, the terms tail gas burner and catalytic converter can be used interchangeably as known to those in the art. In some aspects and embodiments, the tail gas burner burns and extracts useful heat from any fuel in the exhaust stream not already converted or consumed by the fuel cell. In some aspects and embodiments, the heat recuperator or heat exchanger extracts thermal energy from the exhaust flow of the reactor for use in pre-heating the incoming fuel and air streams for the fuel cell.

A third exemplary device implementation, relates to a fuel cell apparatus that includes a fuel cell and a tail gas burner in thermal communication with the fuel cell. The fuel cell and the tail gas burner re arranged to produce a power density greater than or equal to about 2 W/cc.

A fourth exemplary device implementation, relates to a method of minimizing heat loss during operation of a solid oxide fuel cell. The method includes the steps of providing a housing containing a fuel cell, and operating the fuel cell so the ratio of power to the volume of the housing is greater than about 2 W/cc.

In fifth exemplary device implementation, the device relates to a fuel cell apparatus that includes a first solid oxide fuel cell and a second solid oxide fuel cell. The first solid oxide fuel cell includes an anode layer, a cathode layer, and an electrolyte layer. In turn, the second solid oxide fuel cell includes an anode layer, a cathode layer, and an electrolyte layer. In this aspect, the distance between a center line of the electrolyte layer of the first solid oxide fuel cell and a center line of the electrolyte layer of the second solid oxide fuel cell is less than or equal to about 1.5 mm or about 1 mm.

In a sixth exemplary device implementation, the device relates to a fuel cell apparatus that includes a solid oxide fuel cell and a low thermal conductance fluid connection element in fluid communication with the solid oxide fuel cell. The solid oxide fuel cell is adapted to operate at a temperature greater than or equal to about 400° C. Also, the low thermal conductance fluid connection element is designed to produce a thermal loss due to the solid cross section of the low thermal conductance fluid connection element such that the loss is less than about 0.1 watts per low thermal conductance fluid connection element.

In a seventh exemplary device implementation, the device relates to an apparatus that includes a solid oxide fuel cell and a low thermal conductance electrical element in electrical communication with the solid oxide fuel cell. The solid oxide fuel cell is adapted to operate at a temperature greater than or equal to about 600° C. and the low thermal conductance electrical element has a resistance greater than or equal to about 0.5 ohms. In one embodiment, the low thermal conductance electrical element includes platinum and has a diameter less than or equal to about 200 µm or about 100 µm.

In an eighth exemplary device implementation, the device includes a housing containing a solid oxide fuel cell and an insulating volume disposed adjacent to an exterior of the housing. The insulating volume is at a reduced pressure.

In a ninth exemplary device implementation, the device includes a housing containing a solid oxide fuel cell, an insulating volume disposed adjacent to an exterior of the housing, and a heat exchanger in thermal communication with the solid oxide fuel cell. The heat exchanger is located in the insulating volume.

In a tenth exemplary device implementation, the device includes a solid oxide fuel cell and a low thermal conductance fluid connection element in fluid communication with the solid oxide fuel cell. The solid oxide fuel cell is adapted to operate at a temperature greater than or equal to about 400° C. The low thermal conductance fluid connection element is designed to produce a thermal loss due to its solid cross section that is less than about 0.1 watts per low thermal conductance fluid connection element.

In an eleventh exemplary device implementation, the device includes a solid oxide fuel cell and a low thermal conductance electrical element in electrical communication with the solid oxide fuel cell. The solid oxide fuel cell is adapted to operate at a temperature greater than or equal to about 400° C. and the low thermal conductance electrical element has a resistance greater than or equal to about 0.5 ohms. In certain embodiments, the low thermal conductance electrical element comprises platinum and/or has a diameter less than or equal to about 200 µm.

In a twelfth exemplary device implementation, the device relates to a fuel cell apparatus that includes a housing containing a solid oxide fuel cell and an insulating volume disposed adjacent to an exterior of the housing. The insulating volume is at a reduced pressure.

In a thirteenth exemplary device implementation, the device relates to a fuel cell apparatus that includes a housing containing a solid oxide fuel cell, an insulating volume disposed adjacent to an exterior of the housing, and a heat exchanger in thermal communication with the solid oxide fuel cell. The heat exchanger is located in the insulating volume.

In a fourteenth exemplary device implementation, the device relates to a fuel cell apparatus that includes a space separation means for defining a substantially isothermal zone and for integrating elements together within a particular space. As such, the space separation means integrates a means for turning fuel into electricity and a means for burning and extracting thermal energy from any fuel within the isothermal zone. The means for turning fuel into electricity and the means for burning and extracting thermal energy are in thermal communication and share a common wall. In one embodiment, the space separation means is a housing. In another embodiment, the space separation means is an outer wall. In yet another embodiment, the space separation means is a semiconductor structure.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

Each of the patent documents and scientific publications disclosed hereinabove is incorporated by reference herein for all purposes.

We claim:

1. An apparatus comprising:
   a fuel cell housing,
   a fuel cell disposed within the fuel cell housing,
   an insulating volume disposed adjacent to an exterior of the fuel cell housing and defining an area of reduced thermal conduction, and
   a flame arrester conduit in fluid communication with the fuel cell and an exterior of the insulating volume, wherein the flame arrester conduit spans a portion of the insulating volume.

2. The apparatus of claim 1, further comprising a device housing placed around the fuel cell housing and spaced away from the exterior of the fuel cell housing to define a chamber for the insulating volume.

3. The apparatus of claim 1, wherein the fuel cell housing has an interior chamber having a volume of less than or equal to about 100 cc.

4. The apparatus of claim 1, wherein the area has a reduced pressure less than or equal to about 100 mtorr.

5. The apparatus of claim 1, further comprising a fuel reformer disposed within the fuel cell housing and in fluid communication with the fuel cell.

6. The apparatus of claim 1, further comprising a tail gas burner disposed within the fuel cell housing and in fluid communication with the fuel cell.

7. The apparatus of claim 1, further comprising:
   a sensor positioned to collect data; and
   a fluid flow controller in communication with the sensor.

8. The apparatus of claim 7, wherein the sensor is positioned in communication with the insulating volume, and the sensor is one of a pressure detector or a temperature detector.

9. The apparatus of claim 7, wherein the sensor is positioned in thermal communication with the fuel cell, and the sensor is a temperature detector.

10. The apparatus of claim 7, wherein the sensor is selected from the group consisting of a fluid flow detector, a chemical detector, a pressure detector, a comparator circuit, a voltage detector, a current detector, a direct mass flow rate detector, an indirect mass flow rate detector, a volume flow detector, a differential detector, a temperature detector, a radiation detector, and combinations thereof.

11. The apparatus of claim 7, wherein the data collected is selected from the group consisting of temperature data, fluid flow data, pressure data, radiation data, electric signal data, electric current data, voltage data, geometric data, structural stability data, vibration data, sheer stress data, chemical composition data, and combinations thereof.

12. The apparatus of claim 7, wherein the fluid flow controller is selected from the group consisting of a valve, a unidirectional flow device, a gasket, a seal, a gate, a membrane, an iris, an occluder, a vent, a conduit, and combinations thereof.

13. The apparatus of claim 7, further comprising a fuel source in fluid communication with the fuel cell, wherein the fuel source comprises an authentication circuit in communication with the fluid flow controller.

14. The apparatus of claim 7, further comprising a first conduit in fluid communication with the fuel cell, wherein the fluid flow controller is adapted to regulate fluid flow through the first conduit.

15. The apparatus of claim 1 further comprising a first conduit in fluid communication with a fuel reformer and a second conduit in fluid communication with a tail gas burner, and at least one sensor for measuring fluid flow in at least one of the first or second conduit.

16. The apparatus of claim 1, further comprising a mechanical support connected between the device housing and the fuel cell housing.

17. An apparatus comprising:
a fuel cell housing,
a fuel cell disposed within the fuel cell housing,
an insulating volume disposed adjacent to an exterior of the fuel cell housing and defining a region having a pressure selected to provide thermal insulation proximate the exterior of the fuel cell housing, wherein the insulating volume further defines an area of reduced thermal conduction, and
a flame arrester conduit in fluid communication with the fuel cell and an exterior of the insulating volume, wherein the flame arrester conduit spans a portion of the insulating volume.

18. The apparatus of claim 17, wherein the insulating volume includes at least one of an area of reduced pressure, an insulating fiber material, an insulating gel material, a ceramic material, and a circulating thermally conducting fluid.

19. The apparatus of claim 17, wherein the flame arrester conduit has a diameter that is less than or equal to about 1.54 times a Maximum Experimental Safe Gap for a fluid used in the apparatus.

20. The apparatus of claim 17, wherein the flame arrester conduit has a diameter from about 0.05 mm to about 0.43 mm.

21. The apparatus of claim 17, wherein the insulating volume defines an area of reduced pressure being less than or equal to about 100 mtorr.

22. The apparatus of claim 17, further comprising a control system associated with the fuel cell, wherein the control system is selected from the group consisting of a fluid flow detector, a pressure detector, a comparator circuit, a voltage detector, a current detector, a direct mass flow rate detector, an indirect mass flow rate detector, a volume flow detector, a differential detector, a feedback loop, a temperature detector, a radiation detector, a valve, a unidirectional flow device, a gasket, a seal, a gate, a membrane, an iris, an occluder, a vent, a conduit and combinations thereof.

* * * * *